(12) United States Patent
Tanaka et al.

(10) Patent No.: US 9,810,445 B2
(45) Date of Patent: Nov. 7, 2017

(54) AIR-CONDITIONING SYSTEM

(71) Applicants: Yasuhiko Tanaka, Tokyo (JP);
Atsuhiro Yabuta, Tokyo (JP)

(72) Inventors: Yasuhiko Tanaka, Tokyo (JP);
Atsuhiro Yabuta, Tokyo (JP)

(73) Assignee: Mistubishi Electric Corporation, Tokyo (JP)

( * ) Notice: Subject to any disclaimer, the term of this patent is extended or adjusted under 35 U.S.C. 154(b) by 242 days.

(21) Appl. No.: 14/648,328

(22) PCT Filed: Jan. 25, 2013

(86) PCT No.: PCT/JP2013/051648
§ 371 (c)(1),
(2) Date: May 29, 2015

(87) PCT Pub. No.: WO2014/115316
PCT Pub. Date: Jul. 31, 2014

(65) Prior Publication Data
US 2015/0308707 A1    Oct. 29, 2015

(51) Int. Cl.
*F24F 11/00* (2006.01)
*G05B 15/02* (2006.01)

(52) U.S. Cl.
CPC ........ *F24F 11/0086* (2013.01); *F24F 11/006* (2013.01); *G05B 15/02* (2013.01);
(Continued)

(58) Field of Classification Search
CPC ................ F24F 11/0086; F24F 11/006; F24F 2011/0061; F24F 2011/0063;
(Continued)

(56) References Cited

U.S. PATENT DOCUMENTS

2006/0245371 A1*  11/2006  Joiner ................. H04L 63/1416
                                                370/252
2009/0066508 A1*   3/2009  Ueda ..................... G08C 19/00
                                                340/540
(Continued)

FOREIGN PATENT DOCUMENTS

EP    2 053 318 A2    4/2009
JP    2003-307335 A    10/2003
(Continued)

OTHER PUBLICATIONS

Machine translation of JP 2008-249233, Tamura Kazuya, Air Conditioning System, Oct. 16, 2008, 9 pages.*
(Continued)

*Primary Examiner* — Sean Shechtman
*Assistant Examiner* — Tri T Nguyen
(74) *Attorney, Agent, or Firm* — Posz Law Group, PLC

(57) ABSTRACT

An air-conditioning system includes a general-purpose device controller which controls a general-purpose device and an air-conditioning facility. The general-purpose device controller includes a processing configuration unit which receives a first signal corresponding to the air-conditioning facility and a second signal corresponding to the general-purpose device and transmits a control signal which controls the air-conditioning facility and the general-purpose device based on the first signal and the second signal. The processing configuration unit is configured to designate the air-conditioning facility which is a first control target, with a management address which is included in the first signal and designate the air-conditioning facility, designate the general-purpose device which is a second control target, with an input/output port number which is included in the second signal and designate the general-purpose device, and trans- (Continued)

mit the control signal which performs ganged control of the first control target and the second control target.

10 Claims, 16 Drawing Sheets

(52) U.S. Cl.
CPC ............... *F24F 2011/0061* (2013.01); *F24F 2011/0063* (2013.01); *F24F 2011/0064* (2013.01); *F24F 2011/0068* (2013.01); *F24F 2011/0091* (2013.01); *G05B 2219/2642* (2013.01)

(58) Field of Classification Search
CPC ....... F24F 2011/0064; F24F 2011/0068; F24F 2011/0091; G05B 15/02; G05B 2219/2642

See application file for complete search history.

(56) References Cited

U.S. PATENT DOCUMENTS

| | | | |
|---|---|---|---|
| 2012/0158159 A1* | 6/2012 | Kuroiwa | ............... F24F 11/006 700/83 |
| 2012/0191254 A1 | 7/2012 | Cho | |
| 2012/0216556 A1 | 8/2012 | Kanbara | |

FOREIGN PATENT DOCUMENTS

| | | | |
|---|---|---|---|
| JP | 2006-350502 | A | 12/2006 |
| JP | 2007-327655 | A | 12/2007 |
| JP | 2008-249233 | A | 10/2008 |
| JP | 2009-008341 | A | 1/2009 |
| JP | 2010-178127 | A | 8/2010 |
| JP | 2011-052930 | A | 3/2011 |
| JP | 2012-022583 | A | 2/2012 |
| JP | 2012-124567 | A | 6/2012 |
| WO | 2004/032425 | A1 | 4/2004 |
| WO | 2011/058857 | A1 | 5/2011 |

OTHER PUBLICATIONS

Machine translation of JP2003-307335, Masui Koki, Air Conditioning System, Oct. 31, 2003, 18 pages.*
International Search Report of the International Searching Authority dated Apr. 23, 2013 for the corresponding international application No. PCT/JP2013/051648 (and English translation).
Office Action dated Mar. 15, 2016 in the corresponding JP application No. 2014-558395 (with English translation).
Office Action dated Jan. 3, 2017 in the corresponding CN application No. 201380071286.6 (with English translation).
Extended European Search Report dated Aug. 30, 2016 issued in corresponding EP patent application No. 13872374.7.

\* cited by examiner

FIG. 14
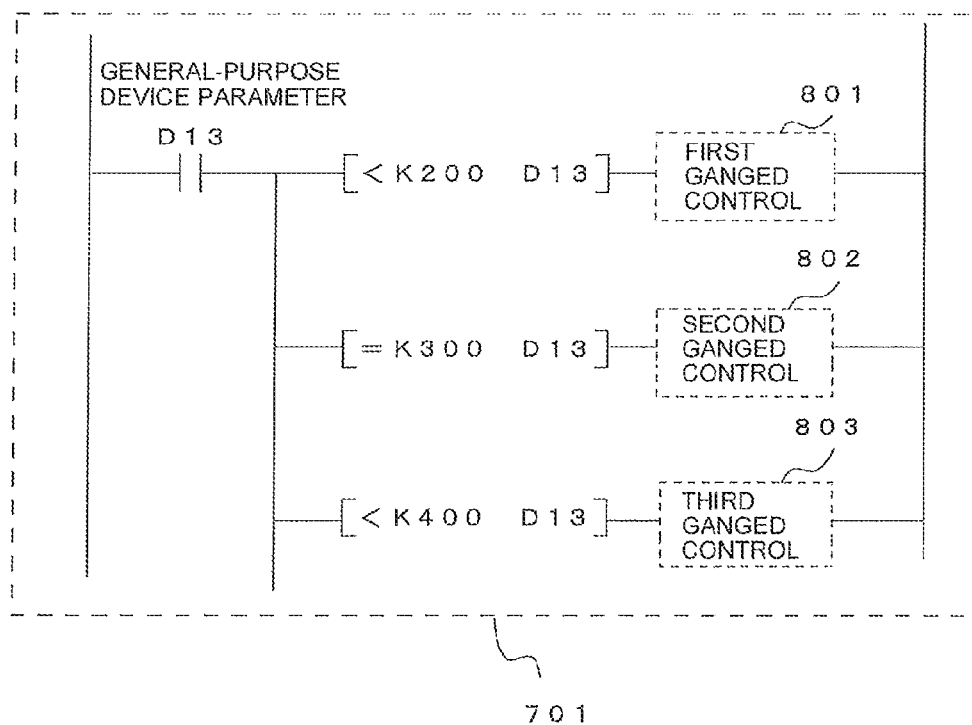
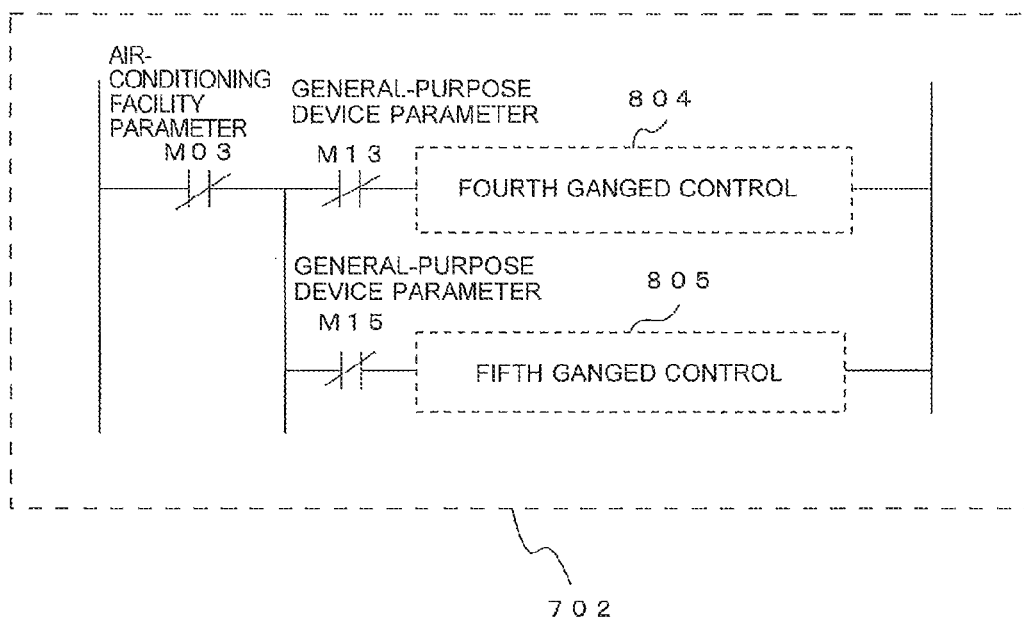

AIR-CONDITIONING SYSTEM

CROSS REFERENCE TO RELATED APPLICATION

This application is a U.S. national stage application of International Application No. PCT/JP2013/051648 filed on Jan. 25, 2013, the disclosure of which is incorporated by reference.

TECHNICAL FIELD

The present invention relates to an air-conditioning system.

BACKGROUND ART

Among the existing air-conditioning systems, there is an air-conditioning system which includes a plurality of air-conditioning devices and a relay device which relays communications between the air-conditioning devices for which communication protocols are different from each other (e.g., see Patent Literature 1).

In addition, among the existing air-conditioning systems, there is an air-conditioning system which includes a plurality of air-conditioning devices for each of which a control program is updated (e.g., see Patent Literature 2).

CITATION LIST

Patent Literature

Patent Literature 1: Japanese Unexamined Patent Application Publication No. 2007-327655 (paragraph [0056])
Patent Literature 2: Japanese Unexamined Patent Application Publication No. 2011-52930 (paragraph [0065])

SUMMARY OF INVENTION

Technical Problem

In the existing air-conditioning system (Patent Literature 1), the relay device merely relays communications between the air-conditioning devices, and does not relay communications between each air-conditioning device and a device other than the air-conditioning device. For example, the relay device does not relay communications between an air-conditioning facility including an air-conditioning device and a general-purpose device such as a humidifier.

In addition, in the existing air-conditioning system (Patent Literature 2), an operation of updating the control program for the air-conditioning device is merely enabled depending on a situation within an area, and update of a control program by which ganged control of each air-conditioning device and each general-purpose device is performed is not performed.

Therefore, the existing air-conditioning systems (Patent Literature 1 and 2) have the problem in that it is not possible to perform ganged control of the air-conditioning facility and the general-purpose device.

The present invention has been made in order to solve the problems described above, and an object of the present invention is to provide an air-conditioning system which allows ganged control of an air-conditioning facility and a general-purpose device to be performed.

Solution to Problem

An air-conditioning system according to the present invention includes a general-purpose device controller configured to control a general-purpose device connected via a general-purpose transmission line or an input/output signal line and an air-conditioning facility connected via a dedicated transmission line. The general-purpose device controller includes a processing configuration unit configured to receive a first signal corresponding to the air-conditioning facility and a second signal corresponding to the general-purpose device, and transmit a control signal which controls the air-conditioning facility and the general-purpose device based on the first signal and the second signal. The processing configuration unit is configured to designate the air-conditioning facility which is a first control target, with a management address which is included in the first signal and designate the air-conditioning facility; designate the general-purpose device which is a second control target, with an input/output port number which is included in the second signal and designate the general-purpose device; and transmit the control signal which performs ganged control of the first control target and the second control target.

Advantageous Effects of Invention

In the present invention, since complex control commands which designate an air-conditioning device provided in the air-conditioning facility and to the general-purpose device, respectively, are sent to the air-conditioning facility and the general-purpose device via respective communication media, it is possible to perform ganged control of the air-conditioning facility and the general-purpose device. Thus, it is possible to provide an air-conditioning system which includes the air-conditioning facility and the general-purpose device and performs integrated control. Therefore, an advantageous effect is achieved that it is possible to improve the energy saving performance of the entire system and the comfort.

BRIEF DESCRIPTION OF DRAWINGS

FIG. 14 is a diagram showing an example of various PLC programs according to Embodiment 1 of the present invention.

DESCRIPTION OF EMBODIMENTS

Hereinafter, embodiments of the present invention will be described in detail with reference to the drawings.

Embodiment 1

Figure 1:
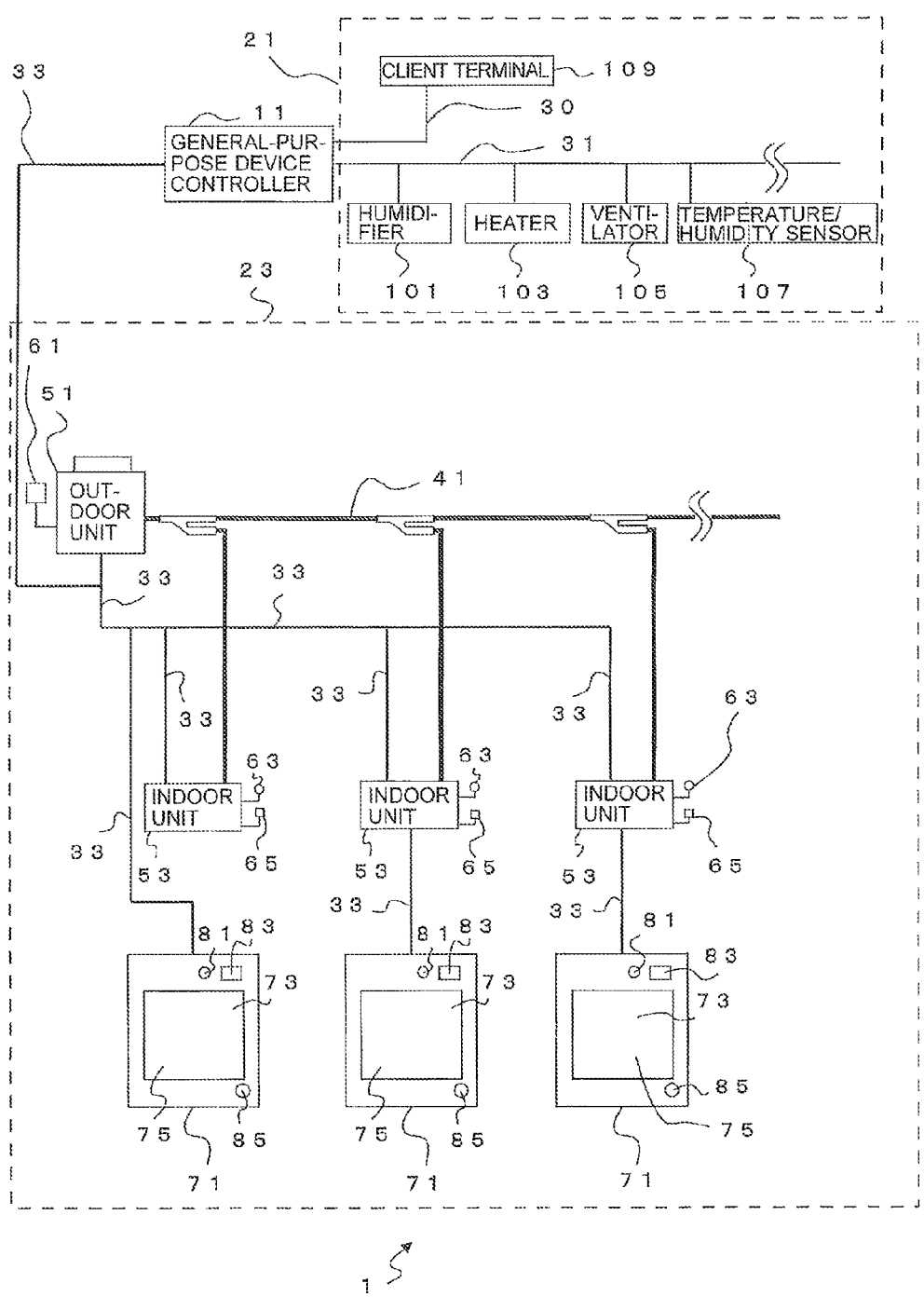
FIG. 1 is a diagram showing an example of a schematic configuration of an air-conditioning system 1 according to Embodiment 1 of the present invention.

FIG. 1 is a diagram showing an example of a schematic configuration of an air-conditioning system 1 according to Embodiment 1 of the present invention. In Embodiment 1, complex control commands which designate an air-conditioning facility 23 and a general-purpose device 21, respectively, are sent to the air-conditioning facility 23 and the general-purpose device 21 via respective communication media, whereby ganged control of the air-conditioning facility 23 and the general-purpose device 21 are performed. Thus, the air-conditioning system 1 is provided which includes the air-conditioning facility 23 and the general-purpose device 21 and performs integrated control. Therefore, the energy saving performance and the comfort of the entire system are improved.

As shown in FIG. 1, the air-conditioning system 1 includes a general-purpose device controller 11, the general-purpose device 21, and the air-conditioning facility 23. The general-purpose device controller 11 and the general-purpose device 21 are connected to each other via a general-purpose transmission line 30 or an input/output signal line 31. The general-purpose device controller 11 and the air-conditioning facility 23 are connected to each other via a dedicated transmission line 33.

The general-purpose transmission line 30 is generally a communication medium through which communication that complies with a communication protocol that is open to the outside is performed. The input/output signal line 31 is a communication medium through which an input signal and an output signal for causing various devices connected to the input/output signal line 31 to execute various input/output processes are transferred between various devices which are targets of the various input/output processes. The dedicated transmission line 33 is a communication medium through which communication that complies with a communication protocol that is not open to the outside is performed.

Next, the general-purpose device 21 will be described. The general-purpose device 21 includes devices which are connected to the general-purpose transmission line 30 or the input/output signal line 31 and controlled by the general-purpose device controller 11. For example, as the general-purpose device 21, a humidifier 101 is connected to the input/output signal line 31. Thus, the general-purpose device controller 11 and the humidifier 101 are connected to each other via the input/output signal line 31. In addition, the humidifier 101 humidifies an air-conditioned space by discharging water contained in the device. Therefore, the humidifier 101 transmits and receives various signals to and from the general-purpose device controller 11 and is controlled based on various control signals from the general-purpose device controller 11, thereby humidifying the air-conditioned space.

For example, as the general-purpose device 21, a heater 103 is connected to the input/output signal line 31. Thus, the general-purpose device controller 11 and the heater 103 are connected to each other via the input/output signal line 31. In addition, the heater 103 generates heat and supplies the heat to the air-conditioned space. Therefore, the heater 103 transmits and receives various signals to and from the general-purpose device controller 11 and is controlled based on various control signals from the general-purpose device controller 11, thereby supplying heat to the air-conditioned space.

For example, as the general-purpose device 21, a ventilator 105 is connected to the input/output signal line 31. Thus, the general-purpose device controller 11 and the ventilator 105 are connected to each other via the input/output signal line 31. In addition, the ventilator 105 rotates a fan which is not shown, thereby sending air to the air-conditioned space to replace air in the air-conditioned space. Therefore, the ventilator 105 transmits and receives various signals to and from the general-purpose device controller 11 and is controlled based on various control signals from the general-purpose device controller 11, thereby replacing the air in the air-conditioned space.

For example, as the general-purpose device 21, a temperature/humidity sensor 107 is connected to the input/output signal line 31. Thus, the general-purpose device controller 11 and the temperature/humidity sensor 107 are connected to each other via the input/output signal line 31. In addition, the temperature/humidity sensor 107 detects the temperature and the humidity at a location where the temperature/humidity sensor 107 is installed. Therefore, the temperature/humidity sensor 107 supplies a detection result to the general-purpose device controller 11, and the general-purpose device controller 11 performs various processes based on the supplied detection result.

For example, as the general-purpose device 21, a client terminal 109 is connected to the general-purpose transmission line 30. Thus, the general-purpose device controller 11 and the client terminal 109 are connected to each other via the general-purpose transmission line 30. In addition, as described in detail later with reference to FIG. 6, the client terminal 109 changes various settings of the general-purpose device controller 11. Therefore, when the client terminal 109 has changed various settings of the general-purpose device controller 11, the general-purpose device controller 11 executes various processes based on the changed various settings.

An example of the general-purpose device 21 has been described above, but the general-purpose device 21 is not particularly limited to them. In short, the general-purpose device 21 according to Embodiment 1 is various devices connected to the general-purpose transmission line 30, for which a communication protocol is open to the public, or to the input/output signal line 31, through which an input signal and an output signal flow. In the following description, the general-purpose device 21 refers to a device that is in connection with the general-purpose transmission line 30 or the input/output signal line 31, or a device that was in connection with the general-purpose transmission line 30 or the input/output signal line 31. Thus, the general-purpose device 21 means, for example, at least one of one or a plurality of humidifiers 101, one or a plurality of heaters 103, one or a plurality of ventilators 105, one or a plurality of temperature/humidity sensors 107, one or a plurality of client terminals 109, and the like. As the general-purpose device 21, a dehumidifier or the like may be included.

Next, the air-conditioning facility 23 will be described. The air-conditioning facility 23 includes devices which are connected to the dedicated transmission line 33 and controlled by the general-purpose device controller 11. For example, as the air-conditioning facility 23, a single outdoor unit 51 is connected to the dedicated transmission line 33. Thus, the general-purpose device controller 11 and the single outdoor unit 51 are connected to each other via the dedicated transmission line 33. In addition, for example, as the air-conditioning facility 23, three indoor units 53 are connected to the dedicated transmission line 33. Thus, the general-purpose device controller 11 and the multiple indoor units 53 are connected to each other via the dedicated transmission line 33. In addition, the outdoor unit 51 and the indoor units 53 are connected to each other via the dedicated transmission line 33. Thus, the general-purpose device controller 11 is connected to both the outdoor unit 51 and the indoor units 53.

Therefore, the outdoor unit 51 and the indoor units 53 transmit and receive various signals to and from the general-purpose device controller 11 and are controlled based on various control signals from the general-purpose device controller 11, thereby performing various processes. In addition, the outdoor unit 51 and the indoor units 53 are connected to each other by a refrigerant pipe 41. The outdoor unit 51 and the indoor units 53 will be described in detail later with reference to FIGS. 2 and 3.

In addition, as the air-conditioning facility 23, for example, two of air-conditioning remote controllers 71 are connected to the indoor units 53 via the dedicated transmission line 33. Thus, the general-purpose device controller 11 and the air-conditioning remote controllers 71 are connected to each other via the indoor units 53. Therefore, such air-conditioning remote controllers 71 transmit and receive various signals to and from each of the indoor units 53, the outdoor unit 51, and the general-purpose device controller 11.

In addition, as the air-conditioning facility 23, for example, one of the air-conditioning remote controllers 71 is connected directly to the dedicated transmission line 33 without being connected thereto via the indoor unit 53. Thus, such an air-conditioning remote controller 71 is in a state of being able to transmit and receive various signals to and from various devices connected to the dedicated transmission line 33. For example, such an air-conditioning remote controller 71 transmits and receives various signals to and from each of the general-purpose device controller 11 connected to the dedicated transmission line 33, the outdoor unit 51 connected to the dedicated transmission line 33, and the indoor units 53 connected to the dedicated transmission line 33.

Each air-conditioning remote controller 71 includes, for example, an operation section 75. In the air-conditioning remote controller 71, by an operator, which is not shown, operating the operation section 75, an operation command, a stop command, temperature setting, humidity setting, and the like are made for the outdoor unit 51, the indoor unit 53, the general-purpose device 21, and the like, and various signals are transmitted via the dedicated transmission line 33.

Each air-conditioning remote controller 71 includes, for example, a display section 73. For example, the air-conditioning remote controller 71 displays, on the display section 73, various signals transmitted thereto via the dedicated transmission line 33. If the display section 73 is formed by overlaying a touch panel on a liquid crystal display, the display section 73 and the operation section 75 are formed so as to be integrated with each other, and the operability is improved. In this case, the display section 73 is formed as the liquid crystal display, and the operation section 75 is formed as the touch panel. Thus, the operation section 75 is operated by the operator, which is not shown, touching various contents displayed on the display section 73. Therefore, for example, various contents displayed on the liquid crystal display are switched and displayed by the touch panel being operated.

Each air-conditioning remote controller 71 includes an illuminance sensor 81, a human detection sensor 83, and a temperature/humidity sensor 85. The illuminance sensor 81 detects the illuminance around the air-conditioning remote controller 71. The human detection sensor 83 determines whether a person is present near the air-conditioning remote controller 71. For example, when absence of a person is detected by the human detection sensor 83, the air-conditioning remote controller 71 turns off a backlight of the display section 73, and when presence of a person is detected by the human detection sensor 83, the air-conditioning remote controller 71 lights up the backlight of the display section 73, thereby accelerating energy saving performance. The temperature/humidity sensor 85 detects the temperature and the humidity around the air-conditioning remote controller 71.

Examples of the general-purpose device 21 and the air-conditioning facility 23 have been described above, and the general-purpose device 21 and the air-conditioning facility 23 are not particularly limited thereto. For example, each air-conditioning remote controller 71 may include a liquid crystal display as the display section 73, may include a plurality of push buttons and the like as the operation section 75, and may not include various sensors such as the illuminance sensor 81, the human detection sensor 83, and the temperature/humidity sensor 85. In addition, the example has been described in which the air-conditioning remote controller 71 is provided for each indoor unit 53, but a single remote controller which performs integrated control may be provided. In addition, the number of outdoor units 51 and the number of indoor units 53 are not particularly limited. Moreover, the connection relationship of each component within the general-purpose device 21 and the connection relationship of each component of the air-conditioning facility 23 as described above are shown as merely examples, and are not particularly limited thereto.

Figure 2:
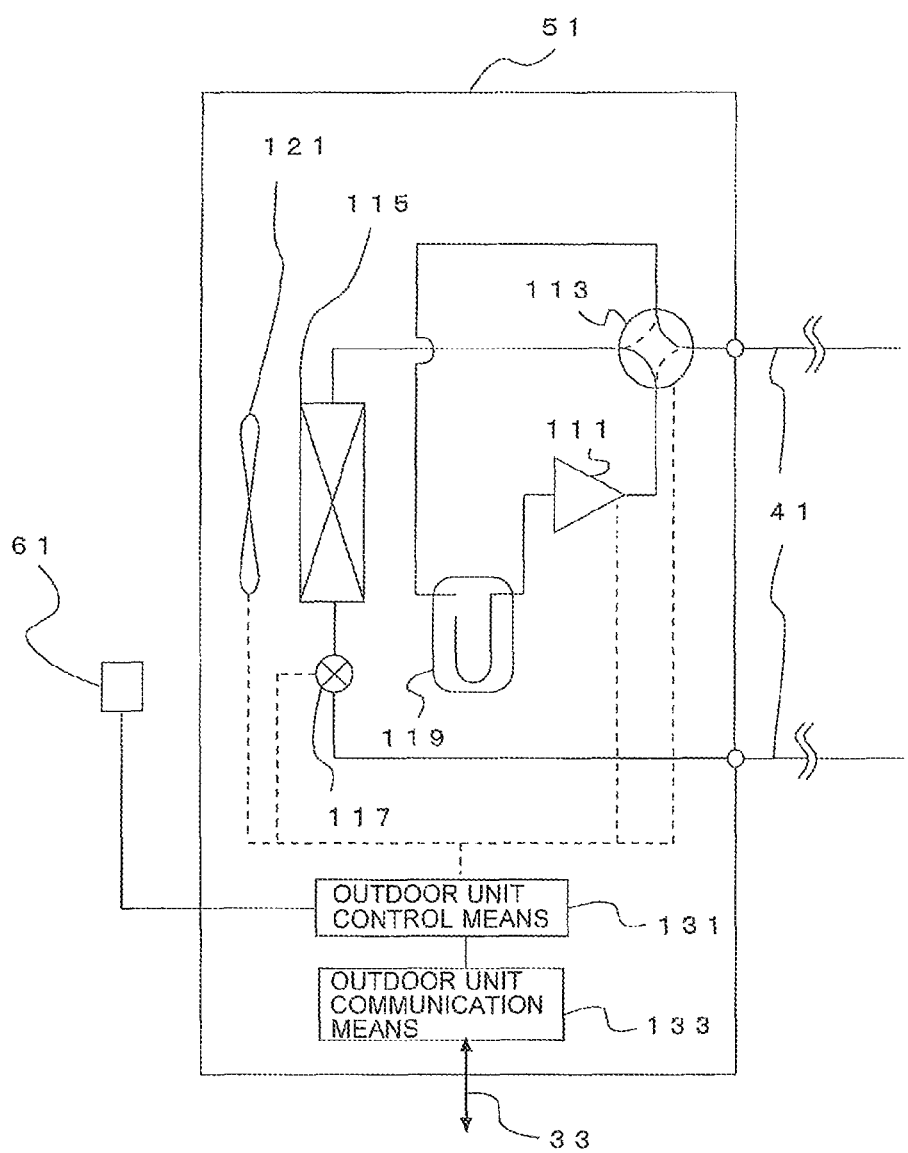
FIG. 2 is a diagram showing an example of a detailed configuration of an outdoor unit 51 according to Embodiment 1 of the present invention.

Next, the outdoor unit 51 will be described. FIG. 2 is a diagram showing an example of a detailed configuration of the outdoor unit 51 according to Embodiment 1 of the present invention. As shown in FIG. 2, the outdoor unit 51 includes a compressor 111, a four-way switching valve 113, an outdoor unit side heat exchanger 115, an outdoor unit side expansion valve 117, an accumulator 119, an outdoor unit side fan 121, outdoor unit control means 131, and outdoor unit communication means 133.

The outdoor unit communication means 133 transmits and receives various signals and the like via the dedicated transmission line 33. For the outdoor unit control means 131, an outdoor unit temperature sensor 61 is provided to the outdoor unit 51. The outdoor unit temperature sensor 61 is a device which detects the temperature around the outdoor unit 51. The outdoor unit control means 131 performs driving of the compressor 111, the four-way switching valve 113, the outdoor unit side expansion valve 117, and the outdoor unit side fan 121 based on various signals and the like supplied from the outdoor unit communication means 133 and a detection result of the outdoor unit temperature sensor 61.

In FIG. 2, the outdoor unit temperature sensor 61 is shown as being provided outside the outdoor unit 51, but is not particularly limited thereto. The outdoor unit temperature sensor 61 suffices to detect the temperature around the outdoor unit 51.

The compressor 111 is a device which compresses sucked refrigerant to apply an optional pressure to the refrigerant based on operating frequency, and discharges the refrigerant. The compressor 111 may be an inverter compressor which is able to vary its capacity by using an inverter circuit which changes the capacity, for example, an amount of the refrigerant discharged per unit time, for example by optionally changing the operating frequency. The four-way switching valve 113 is, for example, a valve which switches a path of a refrigerant pipe in accordance with a cooling operation or a heating operation. The outdoor unit side heat exchanger 115 is a device which exchanges heat between air and the refrigerant passing through the heat exchanger. The outdoor unit side expansion valve 117 is a device which adjusts a valve opening degree based on a control signal from the outdoor unit control means 131 to control a flow of the refrigerant. The accumulator 119 is a device which stores refrigerant liquid therein and causes the compressor 111 to suck only gas-phase refrigerant. The outdoor unit side fan 121 is, for example, a device which sends, to the outdoor unit side heat exchanger 115, air which exchanges heat with the outdoor unit side heat exchanger 115.

Figure 3:
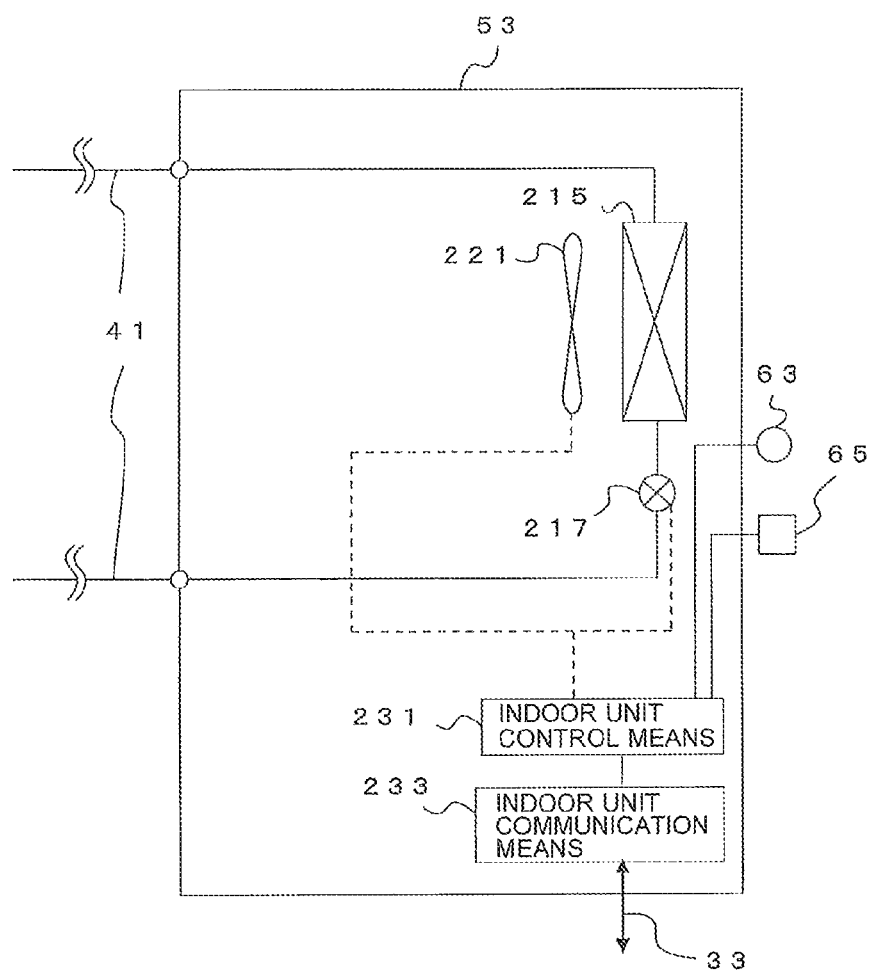
FIG. 3 is a diagram showing an example of a detailed configuration of an indoor unit 53 according to Embodiment 1 of the present invention.

Next, the indoor units 53 will be described. FIG. 3 is a diagram showing an example of a detailed configuration of the indoor unit 53 according to Embodiment 1 of the present invention. As shown in FIG. 3, each indoor unit 53 includes an indoor unit side heat exchanger 215, an indoor unit side expansion valve 217, an indoor unit side fan 221, indoor unit control means 231, and indoor unit communication means 233.

The indoor unit communication means 233 transmits and receives various signals and the like via the dedicated transmission line 33. The indoor unit control means 231 includes an indoor unit humidity sensor 63 and an indoor unit temperature sensor 65. The indoor unit humidity sensor 63 is a device which detects the humidity in the air-conditioned space. The indoor unit temperature sensor 65 is a device which detects the temperature in the air-conditioned space. The indoor unit control means 231 controls driving of the indoor unit side expansion valve 217 and the indoor unit side fan 221 based on various signals and the like supplied from the indoor unit communication means 233, a detection result of the indoor unit humidity sensor 63, and a detection result of the indoor unit temperature sensor 65.

In FIG. 3, the indoor unit humidity sensor 63 and the indoor unit temperature sensor 65 are shown as being provided outside the indoor unit 53, but are not particularly limited thereto. The indoor unit humidity sensor 63 suffices to detect the humidity in the air-conditioned space, and the indoor unit temperature sensor 65 suffices to detect the temperature in the air-conditioned space.

The indoor unit side heat exchanger 215 is a device which exchanges heat between air and the refrigerant passing through the heat exchanger. The indoor unit side expansion valve 217 is a device which adjusts its valve opening degree based on a control signal from the indoor unit control means 231 to control a flow of the refrigerant. The indoor unit side fan 221 is a device which sends, for example, to the indoor unit side heat exchanger 215, air which exchanges heat with the indoor unit side heat exchanger 215.

In the following description, the outdoor unit 51 and the indoor units 53 are collectively referred to as an air-conditioning device.

An example of the air-conditioning facility 23 has been described above, but the air-conditioning facility 23 is not particularly limited thereto. In short, the air-conditioning facility 23 according to Embodiment 1 is a device which is connected to the dedicated transmission line 33 for which a communication protocol is not open to the public and is related to conditioning of air present in an air-conditioned space. In the following description, the air-conditioning facility 23 refers to a device that is in connection with the dedicated transmission line 33 or a device that was in connection with the dedicated transmission line 33. Thus, the air-conditioning facility 23 means, for example, at least one of one or a plurality of outdoor units 51, one or a plurality of indoor units 53, one or a plurality of air-conditioning remote controllers 71, and the like.

Figure 4:
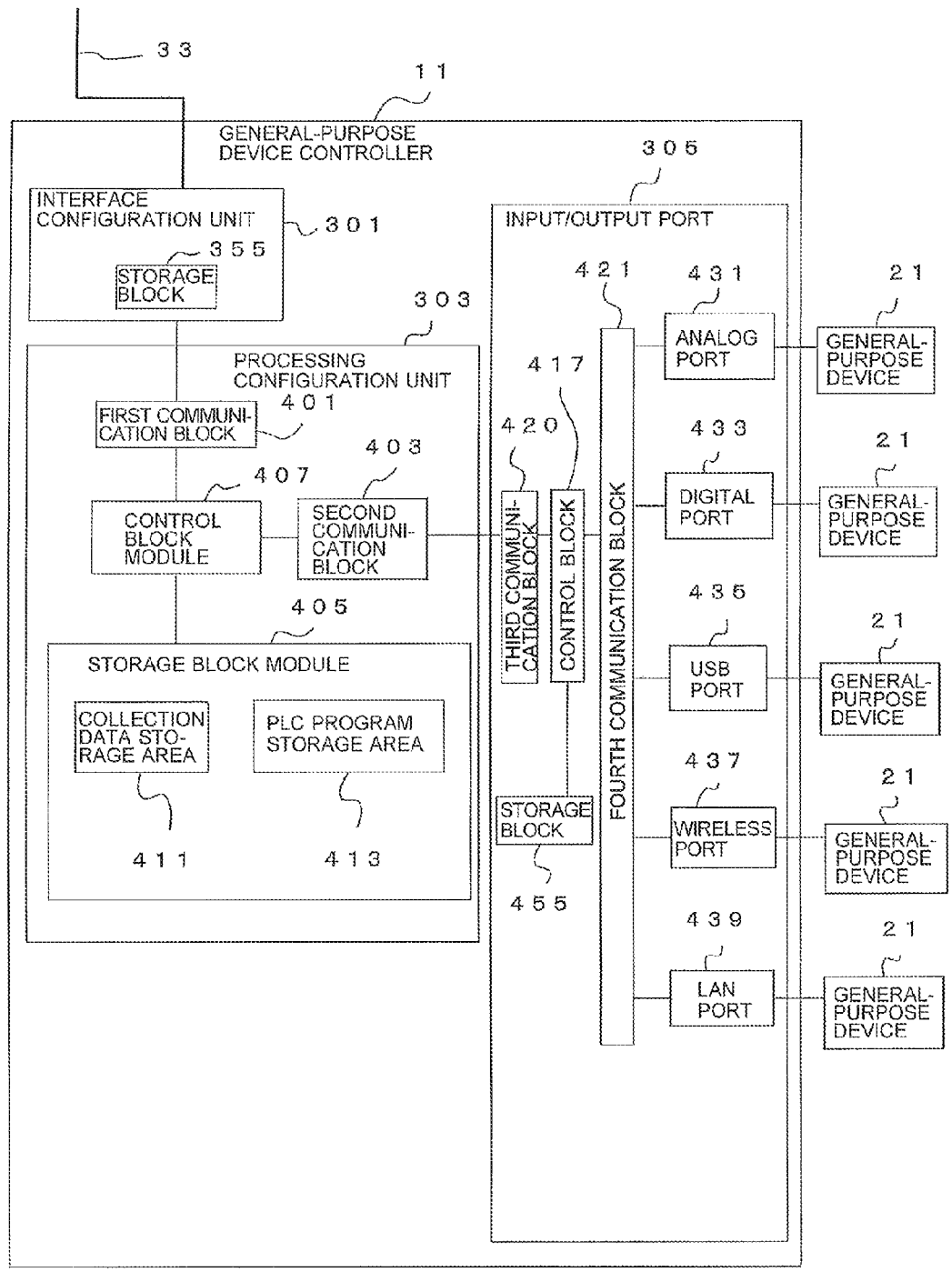
FIG. 4 is a diagram showing an example of a functional configuration of a general-purpose device controller 11 according to Embodiment 1 of the present invention.

Next, the general-purpose device controller 11 will be described. FIG. 4 is a diagram showing an example of a functional configuration of the general-purpose device controller 11 according to Embodiment 1 of the present invention. The general-purpose device controller 11 performs ganged control of the air-conditioning facility 23 and the general-purpose device 21 based on complex control signals which designate the air-conditioning facility 23 and the general-purpose device 21. As shown in FIG. 4, the general-purpose device controller 11 includes an interface configuration unit 301, a processing configuration unit 303, and an input/output port 305.

The interface configuration unit 301 includes a storage block 355, receives a communication frame flowing through the dedicated transmission line 33, stores the received communication frame in the storage block 355, and supplies the communication frame stored in the storage block 355, to the processing configuration unit 303 at a predetermined interval. That is, the interface configuration unit 301 relays various signals transmitted and received between the air-conditioning facility 23 and the processing configuration unit 303.

The communication frame is formed in a format which complies with the communication protocol used in communication via the dedicated transmission line 33. The communication frame includes: a header portion which includes actual data of, for example, a transmission source address, a transmission destination address, a telegram length of a communication command, and the like; a communication command portion; and a frame check portion which includes a code which detects a transmission error.

The communication command portion includes a communication command classification portion which indicates classification of a communication command; an operation content portion which represents an operation content of the communication command; and an operation target portion which represents an operation target of the communication command. An example of the communication frame has been described above, and the communication frame is not particularly limited thereto.

The communication frame including management data corresponds to a first signal in the present invention. For example, the outdoor unit 51 or each indoor unit 53 transmits the management data onto the dedicated transmission line 33. At that time, the interface configuration unit 301 collects the management data flowing on the dedicated transmission line 33. Then, the interface configuration unit 301 determines whether the management data is required management data. If the management data is required, the interface configuration unit 301 stores the management data and a management address corresponding to the management data. In addition, the interface configuration unit 301 requests the outdoor unit 51 or the indoor unit 53 to return the management data at a predetermined cycle. In addition, the interface configuration unit 301 supplies the management data and the like collected from the outdoor unit 51 or the indoor unit 53, to the processing configuration unit 303 at a predetermined cycle different from that at the time of collection.

Here, the management data is, for example, a suction temperature of the compressor 111, an operation mode of the indoor unit 53, or the like. In addition, the management address is the transmission source address of the management data, and when the management address is identified, a network component which is a component of the air-conditioning system 1 is identified. The network component is, for example, the outdoor unit 51, the indoor units 53, the humidifier 101, the heater 103, the ventilator 105, the temperature/humidity sensor 107, and the like. The management address which is a target to be managed by the general-purpose device controller 11 may be previously stored, or may be included in a communication frame to be collected by the interface configuration unit 301.

The input/output port 305 includes a control block 417, a third communication block 420, a fourth communication block 421, an analog port 431, a digital port 433, a USB (Universal Serial Bus) port 435, a wireless port 437, a LAN (Local Area Network) port 439, and a storage block 455.

The control block 417 performs integrated control of the input/output port 305. The third communication block 420 relays communication between the control block 417 and a second communication block 403. The fourth communication block 421 relays communication between the control block 417 and the analog port 431. The fourth communication block 421 relays communication between the control block 417 and the digital port 433. The fourth communication block 421 relays communication between the control block 417 and the USB port 435. The fourth communication block 421 relays communication between the control block 417 and the wireless port 437. The fourth communication block 421 relays communication between the control block 417 and the LAN port 439. The storage block 455 stores various signals and the like.

The control block 417, the third communication block 420, the fourth communication block 421, and the storage block 455 may not be provided. In this case, a control block module 407, the second communication block 403, and a storage block module 405 may be equipped with these functions.

The analog port 431 is a device which receives an analog signal supplied from the general-purpose device 21 connected to the analog port 431 and supplies the analog signal to the fourth communication block 421. In addition, the analog port 431 may convert various signals supplied from the fourth communication block 421 to analog signals in a predetermined range and supply the analog signals to the general-purpose device 21 connected to the analog port 431. Moreover, the analog port 431 supplies an input/output port number allocated to the analog port 431, to the processing configuration unit 303 via the fourth communication block 421 and the third communication block 420.

The digital port 433 is a device which receives a digital signal supplied from the general-purpose device 21 connected to the digital port 433 and supplies the digital signal to the fourth communication block 421. In addition, the digital port 433 may convert various signals supplied from the fourth communication block 421 to digital signals in a predetermined range and supply the digital signals to the general-purpose device 21 connected to the digital port 433. Moreover, the digital port 433 supplies an input/output port number allocated to the digital port 433, to the processing configuration unit 303 via the fourth communication block 421 and the third communication block 420.

The USB port 435 is a device which receives various signal supplied from the general-purpose device 21 connected to the USB port 435 and supplies the signals to the fourth communication block 421. In addition, the USB port 435 may convert various signals supplied from the fourth communication block 421 to various signals in a predetermined range and supply the signals to the general-purpose device 21 connected to the USB port 435. Moreover, the USB port 435 supplies an input/output port number allocated to the USB port 435, to the processing configuration unit 303 via the fourth communication block 421 and the third communication block 420.

The wireless port 437 is a device which receives various signals via a wireless medium from the general-purpose device 21 a communication link of which is established with the wireless port 437, and supplies the signals to the fourth communication block 421. In addition, the wireless port 437 may convert various signals supplied from the fourth communication block 421 to various signals in a predetermined range and supply the signals via a wireless medium to the general-purpose device 21 a communication link of which is established with the wireless port 437. Moreover, the wireless port 437 supplies an input/output port number allocated to the wireless port 437, to the processing configuration unit 303 via the fourth communication block 421 and the third communication block 420. The wireless port 437 transmits and receives wireless signals via, for example, infrared rays, Bluetooth (registered trademark), and the like.

Examples of various ports have been described above, and the various ports are not particularly limited thereto. For example, the input/output port may include an optical port for optical communication.

The communication frame including the input/output port number corresponds to a second signal in the present invention.

The processing configuration unit 303 includes a first communication block 401, the second communication block 403, the storage block module 405, and the control block module 407. The first communication block 401 converts various signals and the like supplied from the interface configuration unit 301 to signals in a predetermined format and supplies the signals to the control block module 407. The second communication block 403 covers various signals and the like supplied from the input/output port 305 to signals in a predetermined format and supplies the signals to the control block module 407.

The storage block module 405 is formed with a collection data storage area 411 and a PLC program storage area 413. Of various signals supplied from the interface configuration unit 301, management data is stored in the collection data storage area 411. In addition, management addresses corresponding to the management data are stored in the collection data storage area 411. Moreover, of various signals supplied from the input/output port 305, input/output port numbers are stored in the collection data storage area 411.

Meanwhile, a control logic which is a control sequence of a PLC program, thresholds used in the control logic, and data collection cycles used in performing various operations described later are stored in the PLC program storage area 413. In the above description, ones regarding the PLC program are stored in the PLC program storage area 413, but the present invention is not particularly limited thereto. For example, a control logic and parameters regarding the control logic suffice to be stored therein. Specifically, an object code corresponding to the control logic and various data associated with parameters used in the object code suffice to be stored therein. In short, ones regarding control commands suffice to be stored therein without depending on a specific programming language and a language system.

The control block module 407 is formed as an updatable program module, and is replaceable as appropriate. The control block module 407 sets a physical execution environment for executing the control logic stored in the PLC program storage area, and controls the control logic. For example, before executing the control logic which performs ganged control of the air-conditioning facility 23 and the general-purpose device 21, the control block module 407 allocates a register and the like which are included in the general-purpose device controller 11 and not shown, based on an input condition and an output condition of the control logic.

Next, when executing the control logic, the control block module 407 executes various calculations by using the allocated register and the like and operates an internal relay and the like which are not shown, thereby transmitting a control signal and the like via the first communication block 401 and the interface configuration unit 301 to the air-conditioning facility 23 and transmitting a control signal and the like via the second communication block 403 and the input/output port 305 to the general-purpose device 21.

Each function of the general-purpose device controller 11 may be implemented by hardware or may be implemented by software. That is, each block diagram described in Embodiment 1 may be considered as a block diagram of hardware or may be considered as a functional block diagram of software. For example, each block diagram may be implemented by hardware such as a circuit device or the like, or may be implemented by software executed on an arithmetic unit such as a processor.

Figure 5:
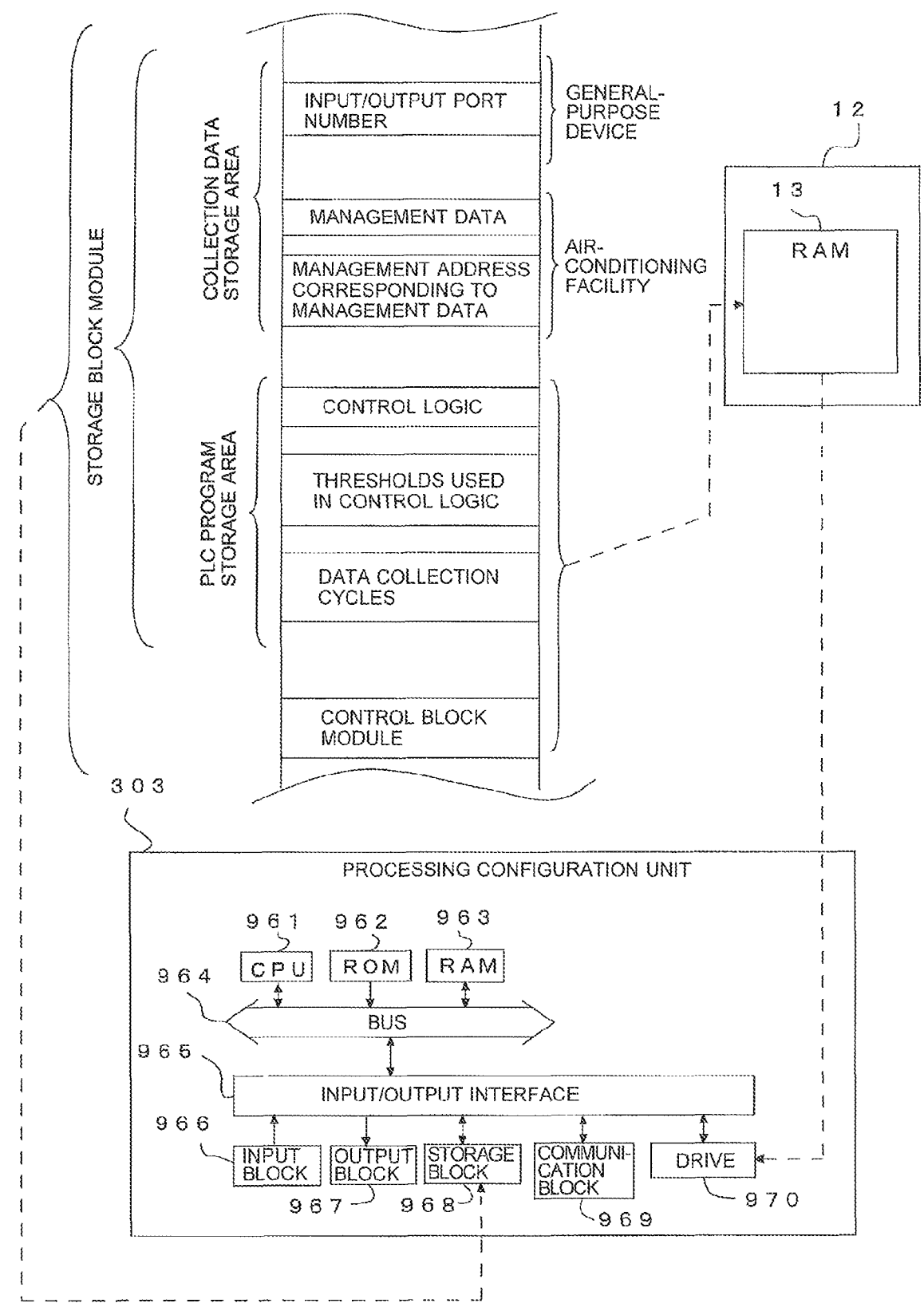
FIG. 5 is a diagram showing an example of a physical configuration of a processing configuration unit 303 and various data allocated to a storage block 968 according to Embodiment 1 of the present invention.

Next, an example of an operation in which the control block module 407 is updated will be described with reference to FIG. 5. FIG. 5 is a diagram showing an example of a physical configuration of the processing configuration unit 303 and various data allocated to a storage block 968 according to Embodiment 1 of the present invention. As shown in FIG. 5, the processing configuration unit 303 includes, as its physical configuration, a CPU (Central Processing Unit) 961, a ROM (Read Only Memory) 962, a RAM (Random Access Memory) 963, a bus 964, an input/output interface 965, an input block 966, an output block 967, the storage block 968, a communication block 969, and a drive 970.

The CPU 961, the ROM 962, and the RAM 963 are connected to each other via the bus 964. The input/output interface 965 is connected to the CPU 961, the ROM 962, and the RAM 963 via the bus 964. The input block 966, the output block 967, the storage block 968, the communication block 969, and the drive 970 are connected to the input/output interface 965.

The CPU 961 executes various processes based on various programs stored in the ROM 962 or the storage block 968. Various programs to be executed by the CPU 961, various data, and the like are stored in the RAM 963 as appropriate. The CPU 961 executes various processes corresponding to various signals input from the input block 966. The CPU 961 outputs results of the various processes to the output block 967.

The storage block 968 is composed of, for example, a hard disk, a semiconductor memory, or the like, and stores various data or various programs to be executed by the CPU 961. The communication block 969 performs various communications with the outside of the processing configuration unit 303. When various media are installed, the drive 970 drives the media, acquires various data stored in the various media, and transfers the various data to the storage block 968 according to need.

In the storage block 968, various data corresponding to the storage block module 405 shown in FIG. 4 and data corresponding to the control block module 407 shown in FIG. 4 are stored. Specifically, the collection data storage area 411 and the PLC program storage area 413 are allocated as the storage block module 405 as shown in FIG. 4.

As shown in FIG. 5, an input/output port number which uniquely identifies the general-purpose device 21, management data which is data regarding the air-conditioning facility 23, a management address corresponding to the management data which identifies the air-conditioning facility 23 are stored in the collection data storage area 411.

As shown in FIG. 5, data of the control logic, data of the thresholds used in the control logic, and data of the data collection cycles are stored in the PLC program storage area 413.

Thus, when the data of the control logic, the data of the thresholds used in the control logic, the data of the data collection cycles, and data of the control block module 407 are stored in a RAM 13 of a memory card 12, it is possible to update the control block module 407 by exchanging the control block module 407 stored in the general-purpose device controller 11 via the memory card 12.

For example, when the memory card 12 is installed, the drive 970 drives the memory card 12 to acquire the data of the control block module 407, the data of the control logic, the data of the thresholds used in the control logic, the data of the data collection cycles, and the like which are stored in the RAM 13. The acquired various data is transferred to the storage block 968 according to need and stored therein.

The mount form of the memory card 12 is not particularly limited. For example, the memory card 12 may be composed of a SRAM (Static Random Access Memory). In addition, for example, the memory card 12 may be mounted as CompactFlash (registered trademark). Moreover, for example, the memory card 12 may be mounted as an ATA (AT Attachment) card.

Update of the control block module 407 may be executed via the communication block 969. For example, the control block module 407 may be updated, for example, by data of the control block module 407 being uploaded on the processing configuration unit 303 via the communication block 969 using the Internet or the like.

Figure 6:
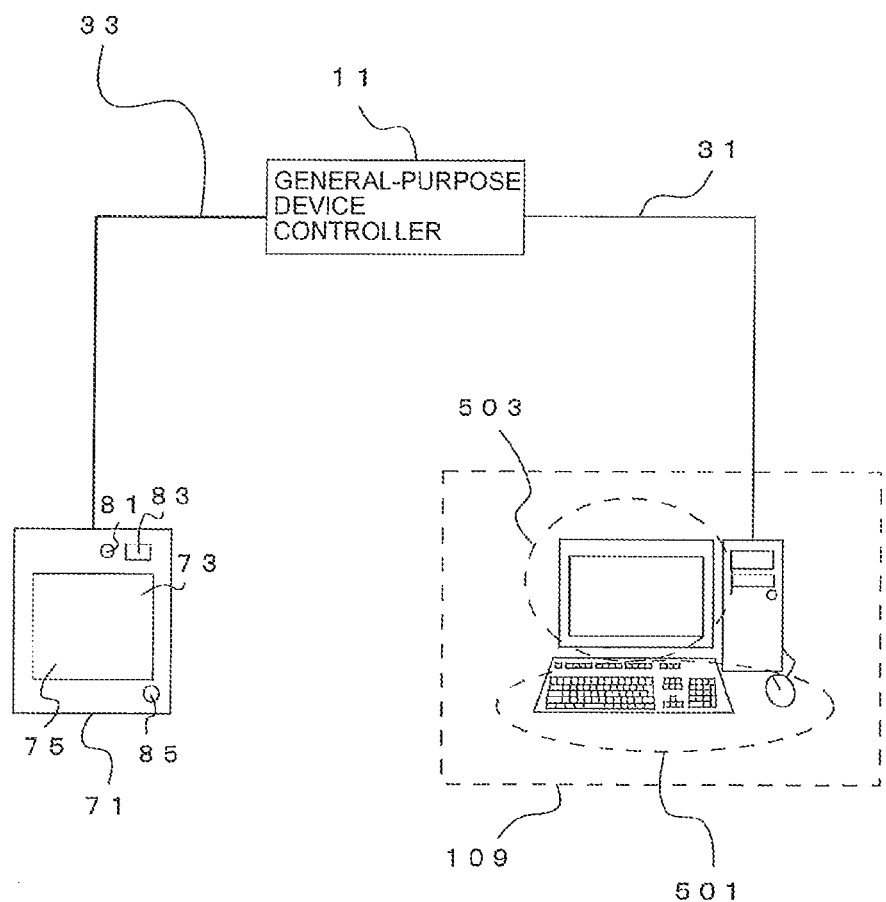
FIG. 6 is a diagram showing an example of devices used in updating a PLC program according to Embodiment 1 of the present invention.
Figure 7:
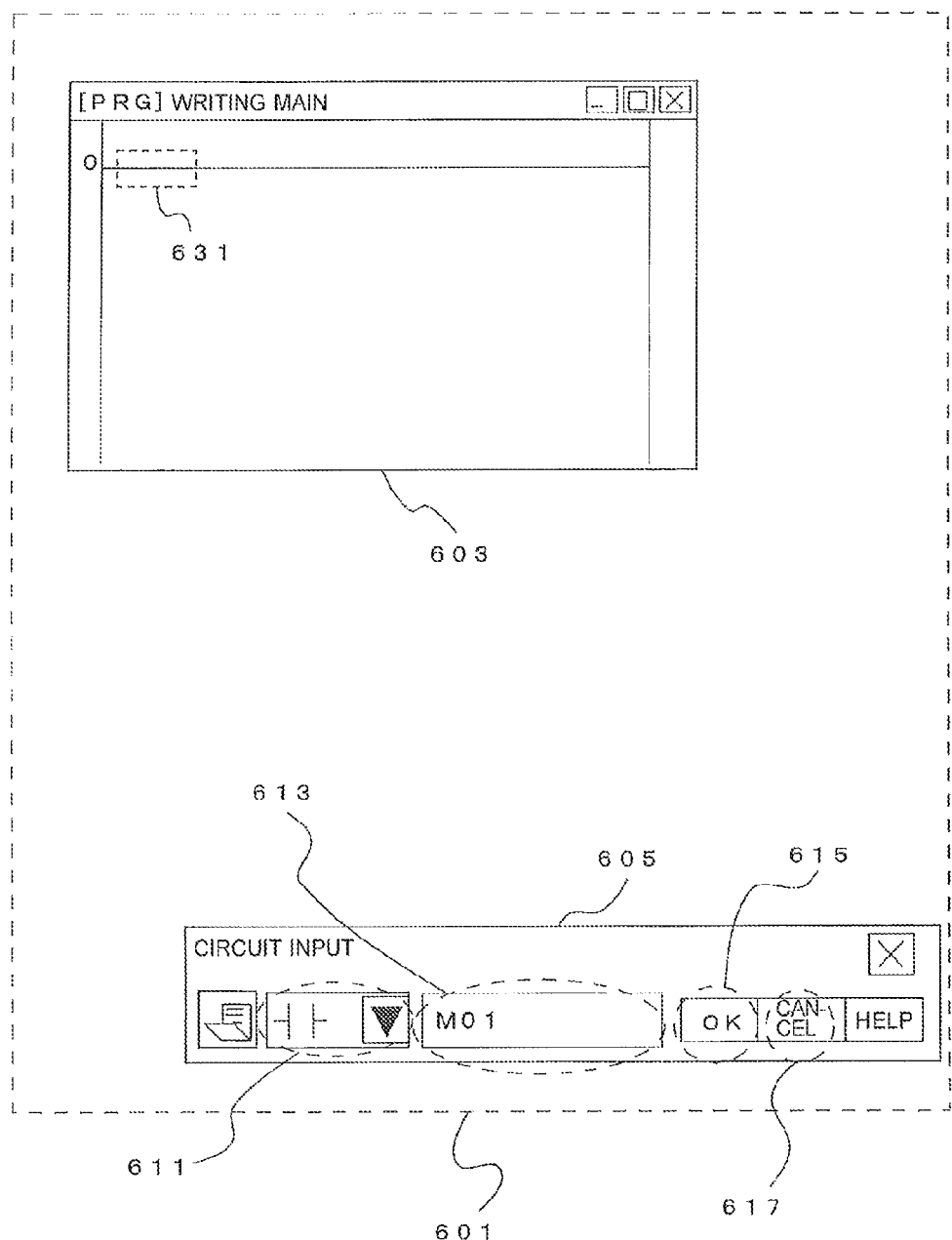
FIG. 7 is a diagram showing an example of an edit screen 601 for the PLC program according to Embodiment 1 of the present invention.
Figure 8:
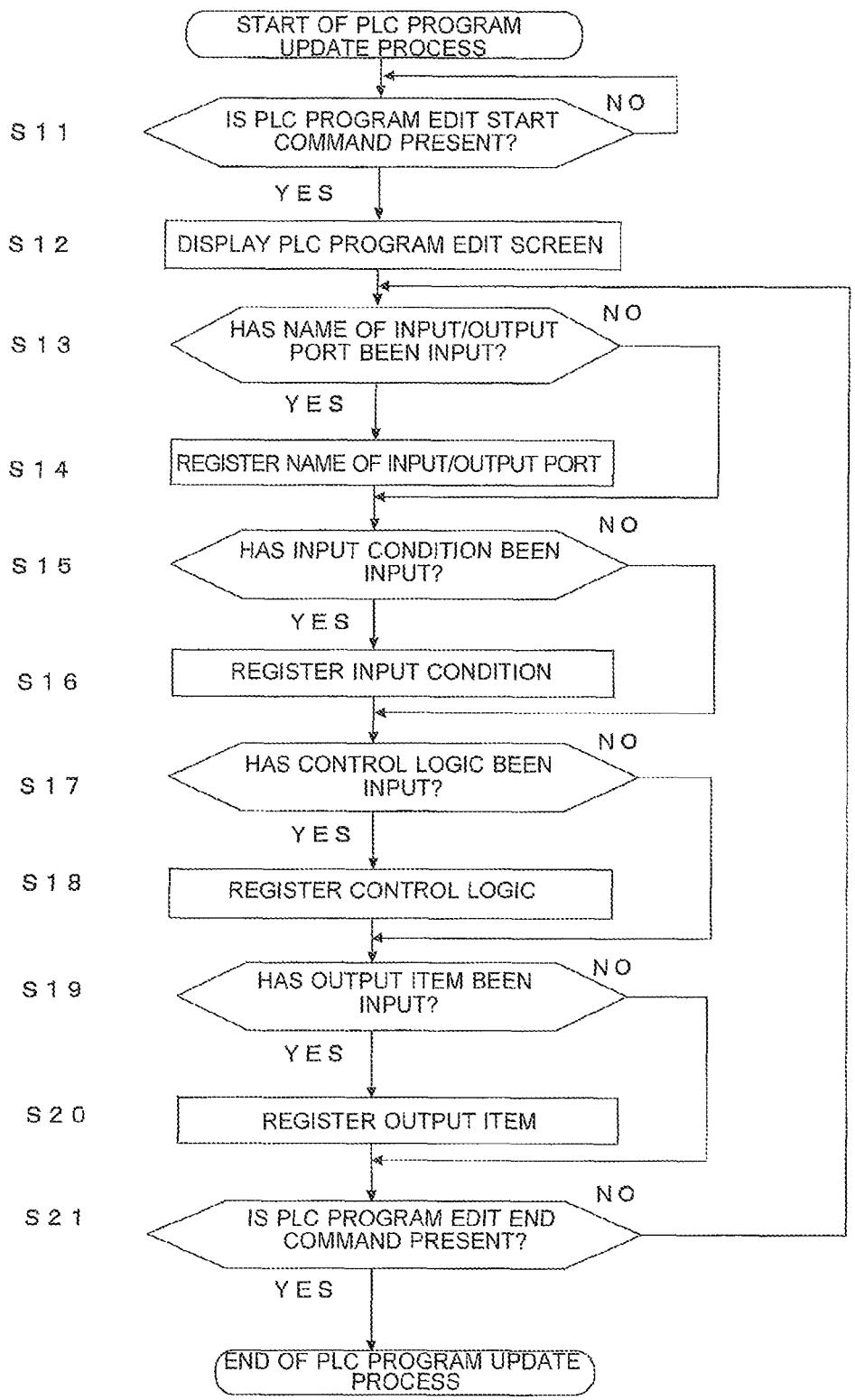
FIG. 8 is a flowchart explaining an example of a PLC program update process of the general-purpose device controller 11 according to Embodiment 1 of the present invention.

Next, an example of an operation in which the PLC program is updated will be described with reference to FIGS. 6 to 8. FIG. 6 is a diagram showing an example of devices used in updating the PLC program according to Embodiment 1 of the present invention. FIG. 7 is a diagram showing an example of an edit screen 601 of the PLC program according to Embodiment 1 of the present invention.

When the PLC program is updated by the air-conditioning remote controller 71, the edit screen 601 described later with reference to FIG. 7 is called from the general-purpose device controller 11 via the dedicated transmission line 33. In this case, various update operations are executed by the operation section 75 being operated by the operator, and the execution result is displayed on the display section 73.

On the other hand, when the PLC program is updated by the client terminal 109, the edit screen 601 described later with reference to FIG. 7 is called from the general-purpose device controller 11 via the general-purpose transmission line 30. In this case, various update operations are executed by the input device 501 of the client terminal 109 being used, and the execution result is displayed on an output device 503. In this case, the input device 501 is, for example, a keyboard and a mouse, and the output device 503 is, for example, a liquid crystal display.

Next, the edit screen 601 will be described with reference to FIG. 7. In the edit screen 601, for example, an edit window 603 and an input window 605 are displayed. In the edit window 603, an editing area 631 is displayed, and an operation result of the input window 605 is reflected in the editing area 631. In the input window 605, for example, a device selection area 611, a device name input area 613, an OK button 615, and a cancel button 617 are formed. In the device selection area 611, for example, a symbol which means connection in series with an A contact is displayed. In the device name input area 613, for example, M01 is designated as an internal relay. In this state, if the OK button 615 is operated, the result is reflected in the editing area 631. Here, the device is a virtual device and means an element constituting the PLC program. Examples of various symbols, various parameters, and various display screens have been described above, and the various symbols, the various parameters, and the various display screens are not particularly limited thereto.

Next, an operation of a PLC program update process will be described based on the contents described above and with reference to FIG. 8. FIG. 8 is a flowchart explaining an example of the PLC program update process of the general-purpose device controller 11 according to Embodiment 1 of the present invention.

In step S11, the general-purpose device controller 11 determines whether a PLC program edit start command is present. If a PLC program edit start command is present, the general-purpose device controller 11 proceeds to step S12. On the other hand, if no PLC program edit start command is present, the general-purpose device controller 11 returns to step S11.

In step S12, the general-purpose device controller 11 displays a PLC program edit screen. For example, in the connection configuration shown in FIG. 6, the general-purpose device controller 11 causes the display section 73 of the air-conditioning remote controller 71 or the output device 503 of the client terminal 109 to display the edit screen 601 shown in FIG. 7.

In step S13, the general-purpose device controller 11 determines whether the name of an input/output port has been input. If the name of an input/output port has been input, the general-purpose device controller 11 proceeds to step S14. On the other hand, if no name of an input/output port has been input, the general-purpose device controller 11 proceeds to step S15.

In the subsequent processing, various input operations are performed via the operation section 75 of the air-conditioning remote controller 71 or the input device 501 of the client terminal 109 shown in FIG. 6, various signals corresponding to these operations are transmitted to the general-purpose device controller 11, and various registrations corresponding to these operations are executed by the general-purpose device controller 11.

In step S14, the general-purpose device controller 11 registers the name of the input/output port. For example, as the name of the input/output port, the general-purpose device controller 11 registers the name of the general-purpose device 21 connected to the input/output port 305, such as the humidifier 101, the heater 103, the ventilator 105, and the temperature/humidity sensor 107. The name of the input/output port thus registered is stored in the PLC program storage area 413 shown in FIG. 4. For example, each name is stored in an area in which thresholds used in the control logic shown in FIG. 5 is stored, so as to be associated with the thresholds. In addition, the logical connection configuration between the general-purpose device controller 11 and the air-conditioning facility 23, for example, the outdoor unit 51 and the indoor unit 53 are previously registered at the general-purpose device controller 11 side. Thus, the logical the logical connection configuration between the air-conditioning facility 23 and the general-purpose device 21 are associated. Therefore, it is possible to display the logical connection relationships between the air-conditioning facility 23 and the general-purpose device 21, on the display section 73 of the air-conditioning remote controller 71 or the output device 503 of the client terminal 109 shown in FIG. 6.

In step S15, the general-purpose device controller 11 determines whether an input condition has been input. If the input condition has been input, the general-purpose device controller 11 proceeds to step S16. On the other hand, if no input condition has been input, the general-purpose device controller 11 proceeds to step S17.

In step S16, the general-purpose device controller 11 registers the input condition. For example, as the input condition, the temperature and the illuminance in the air-conditioned space of the indoor unit 53 are registered in the general-purpose device controller 11. In addition, various input conditions thus registered are demanded and collected by the interface configuration unit 301 every predetermined cycle as will be described later with reference to FIGS. 9 to 13, and the collected input conditions are supplied to the processing configuration unit 303 every predetermined cycle different from that when demanded, and are stored in the collection data storage area 411 shown in FIG. 4. In the collection process, designation of the air-conditioning facility 23 is specified based on the management address, and designation of the general-purpose device 21 is specified based on the input/output port number. Each cycle is changeable as appropriate by the operator who operates the general-purpose device controller 11.

In step S17, the general-purpose device controller 11 determines whether a control logic has been input. If a control logic has been input, the general-purpose device controller 11 proceeds to step S18. On the other hand, if no control logic has been input, the general-purpose device controller 11 proceeds to step S19.

In step S18, the general-purpose device controller 11 registers the control logic. The control logic is defined, for example, with AND condition, OR condition, and a threshold as will be described later. Specifically, the control logic is a condition of whether the set temperature of the indoor unit 53 is equal to or higher than a threshold, whether the operation state of the general-purpose device 21 is during operation, or the like.

In step S19, the general-purpose device controller 11 determines whether an output item has been input. If an output item has been input, the general-purpose device controller 11 proceeds to step S20. On the other hand, if no output item has been input, the general-purpose device controller 11 proceeds to step S21.

In step S20, the general-purpose device controller 11 registers the output item. For example, in registering the output item, the general-purpose device controller 11 specifies an output destination with a management address for the air-conditioning facility 23, specifies an output destination with an input/output port number for the general-purpose device 21, and then registers operations for these specified destinations.

In step S21, the general-purpose device controller 11 determines whether a PLC program edit end command is present. If a PLC program edit end command is present, the general-purpose device controller 11 ends the process. Then, if the process ends, various registration results are stored in the collection data storage area 411 and the PLC program storage area 413 shown in FIG. 4, the edit screen 601 shown in FIG. 7 shifts to an end confirmation screen or the like, end or the like is selected, and the edit screen 601 is closed. On the other hand, if no PLC program edit end command is present, the general-purpose device controller 11 returns to step S13.

Figure 9:
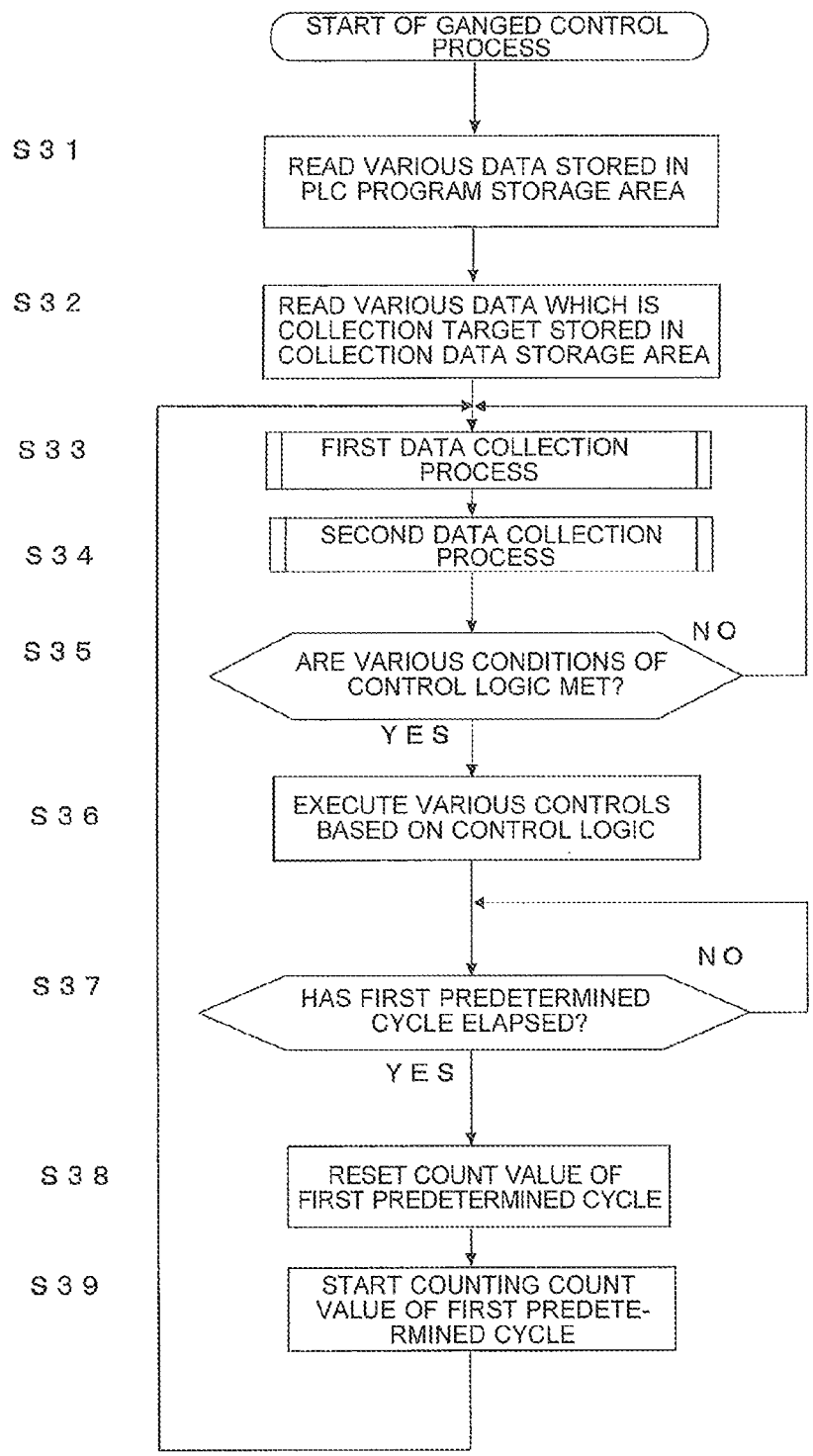
FIG. 9 is a flowchart explaining an example of a ganged control process of the general-purpose device controller 11 according to Embodiment 1 of the present invention.

Next, an example in which the general-purpose device controller 11 performs ganged control of the air-conditioning facility 23 and the general-purpose device 21 will be described with reference to FIGS. 9 to 15. FIG. 9 is a flowchart explaining an example of a ganged control process of the general-purpose device controller 11 according to Embodiment 1 of the present invention.

In step S31, the general-purpose device controller 11 reads various data stored in the PLC program storage area 413. For example, the general-purpose device controller 11 reads the data of the control logic, the data of the threshold used in the control logic, the data of the data collection cycles, and the like from the PLC program storage area 413.

In step S32, the general-purpose device controller 11 reads various data which is a collection target stored in the collection data storage area 411. For example, the general-purpose device controller 11 reads management data, a management address corresponding to the management data, and an input/output port number from the collection data storage area 411. It is assumed that the management data and the management address corresponding to the management data are registered as data and an address to be collected, prior to the ganged control process. For example, it is assumed that when the general-purpose device controller 11 is installed, of the air-conditioning facility 23, devices to be managed, that is, required devices are registered in advance. Even when not registered in advance, management data of the air-conditioning facility 23 to be managed and a management address corresponding to the management data may be registered as appropriate during operation of the air-conditioning system 1.

In step S33, the general-purpose device controller 11 executes a first data collection process described in detail later with reference to FIG. 10. After the first data collection process ends, the general-purpose device controller 11 proceeds to step S34.

In step S34, the general-purpose device controller 11 executes a second data collection process described in detail later with reference to FIG. 13. After the second data collection process ends, the general-purpose device controller 11 proceeds to step S35.

In step S35, the general-purpose device controller 11 determines whether various conditions of the control logic are met. If the various conditions of the control logic are met, the general-purpose device controller 11 proceeds to step S36. On the other hand, if the various conditions of the control logic are not met, the general-purpose device controller 11 returns to step S33.

For example, the general-purpose device controller 11 determines whether a corresponding output condition is met, based on each control sequence described in the PLC program. If the output condition is met, a process corresponding to the output condition is executed in step S36.

In step S36, the general-purpose device controller 11 executes various controls based on the control logic. In executing various controls described in the control logic, the general-purpose device controller 11 executes output control set in the PLC program as appropriate.

In step S37, the general-purpose device controller 11 determines whether a first predetermined cycle has elapsed. If the first predetermined cycle has elapsed, the general-purpose device controller 11 proceeds to step S38. On the other hand, if the first predetermined cycle has not elapsed, the general-purpose device controller 11 returns to step S37.

In step S38, the general-purpose device controller 11 resets a count value of the first predetermined cycle and proceeds to step S39.

In step S39, the general-purpose device controller 11 starts counting a count value of the first predetermined cycle and returns to step S33.

Figure 10:
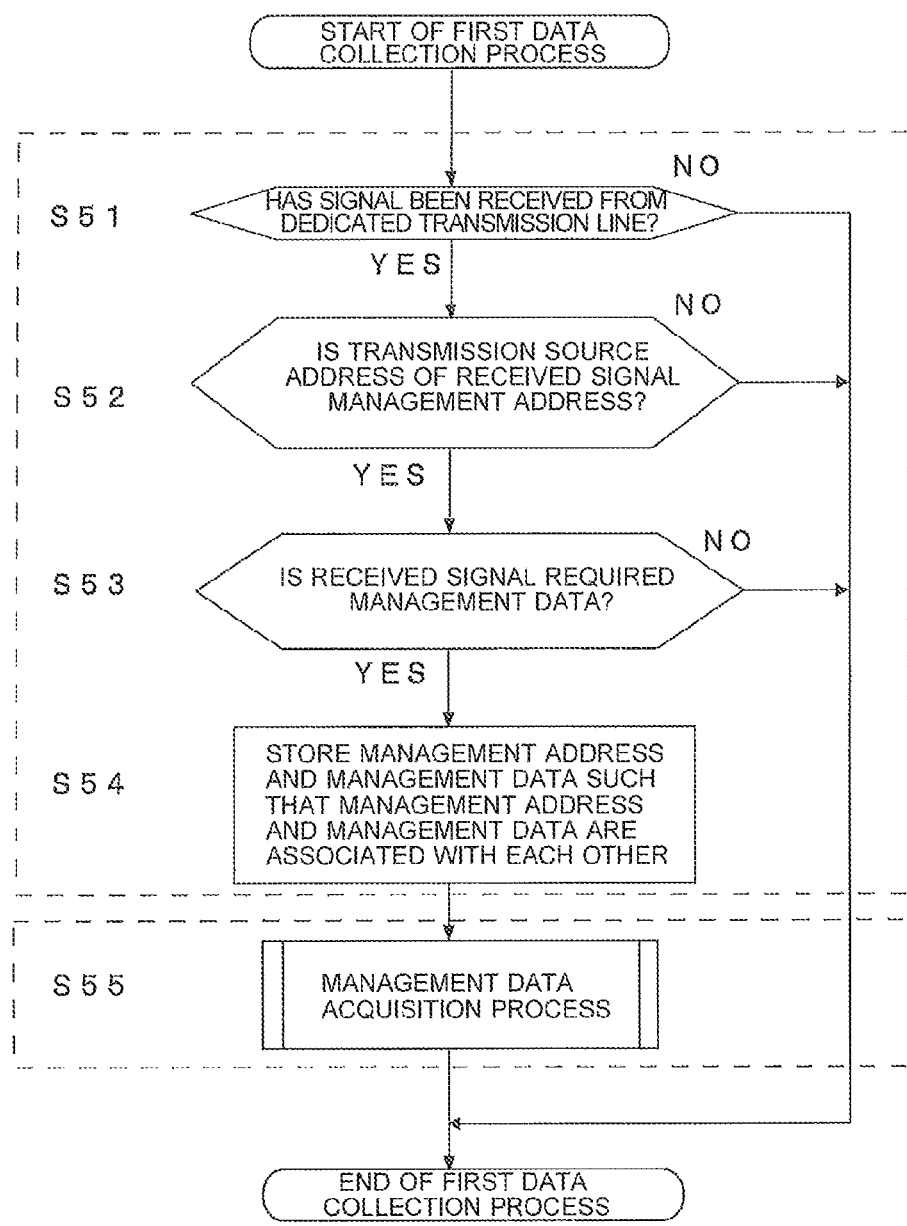
FIG. 10 is a flowchart explaining a detailed example of a first data collection process of the general-purpose device controller 11 according to Embodiment 1 of the present invention.

FIG. 10 is a flowchart explaining a detailed example of the first data collection process of the general-purpose device controller 11 according to Embodiment 1 of the present invention. In the process described with reference to FIG. 10, it is assumed that various signals flow on the dedicated transmission line 33 and the signals flowing on the dedicated transmission line 33 are transmitted to all devices connected to the dedicated transmission line 33. That is, it is assumed that a signal is broadcast from one device to all devices within a network.

In step S51, the general-purpose device controller 11 determines whether a signal has been received from the dedicated transmission line 33. If a signal has been received from the dedicated transmission line 33, the general-purpose device controller 11 proceeds to step S52. On the other hand, if no signal has been received from the dedicated transmission line 33, the general-purpose device controller 11 ends the process.

In step S52, the general-purpose device controller 11 determines whether the transmission source address of the received signal is a management address. If the transmission source address of the received signal is a management address, the general-purpose device controller 11 proceeds to step S53. On the other hand, if the transmission source address of the received signal is not a management address, the general-purpose device controller 11 ends the process.

In step S53, the general-purpose device controller 11 determines whether the received signal is required management data. If the received signal is required management data, the general-purpose device controller 11 proceeds to step S54. On the other hand, if the received signal is not required management data, the general-purpose device controller 11 ends the process.

In step S54, the general-purpose device controller 11 stores the management address and the management data such that the management address and the management data are associated with each other.

In step S55, the general-purpose device controller 11 executes a management data acquisition process. After the management data acquisition process ends, the general-purpose device controller 11 ends the process.

Figure 11:
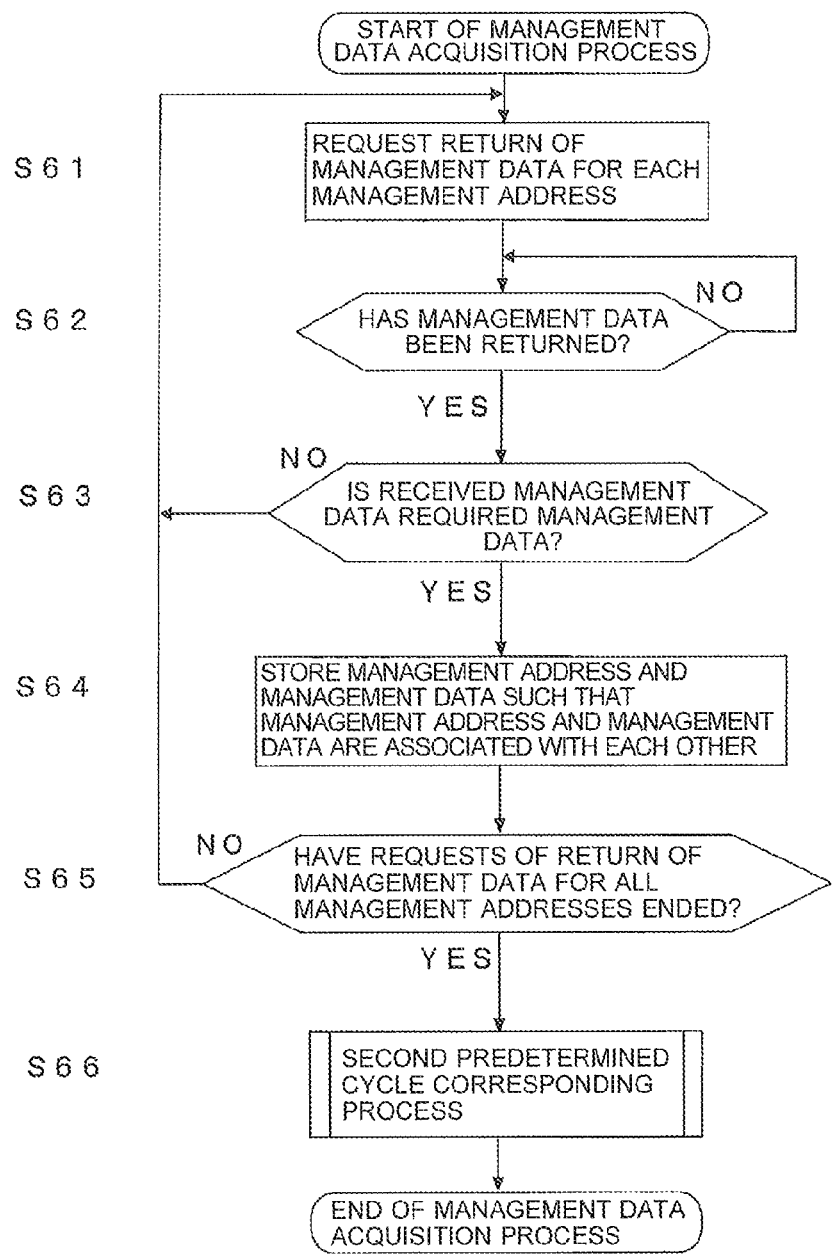
FIG. 11 is a flowchart explaining a detailed example of a management data acquisition process of the general-purpose device controller 11 according to Embodiment 1 of the present invention.

FIG. 11 is a flowchart explaining a detailed example of the management data acquisition process of the general-purpose device controller 11 according to Embodiment 1 of the present invention. The process described with reference to FIG. 11 is an example of a management data collection process performed every first predetermined cycle.

In step S61, the general-purpose device controller 11 requests return of management data for each management address. In the above description, the example in which return of management data is requested for each management address has been described, but return of required management data may be requested together.

In step S62, the general-purpose device controller 11 determines whether management data has been returned. If management data has been returned, the general-purpose device controller 11 proceeds to step S63. If no management data has been returned, the general-purpose device controller 11 returns to step S62.

If no management data has been returned in step S62, the general-purpose device controller 11 may not return to step S62, may execute a process described below, and then may proceed to step S63. For example, if no management data has been returned, a logical connection relationship of the air-conditioning facility 23 corresponding to the management data, with the dedicated transmission line 33 is defined as being cancelled. After defining so, the general-purpose device controller 11 excludes the air-conditioning facility 23 corresponding to the management data from control targets if no management data has been returned. That is, a process is executed in which a control logic using the management data is considered as not having been initially implemented.

In step S63, the general-purpose device controller 11 determines whether the received management data is required management data. If the received management data is required management data, the general-purpose device controller 11 proceeds to step S64. In this case, the general-purpose device controller 11 extracts the management data from a signal flowing on the dedicated transmission line 33. Here, the management data includes a transmission source address, a transmission destination address, and actual data. On the other hand, if the received management data is not required management data, the general-purpose device controller 11 returns to step S61.

In step S64, the general-purpose device controller 11 stores the management address and the management data such that the management address and the management data are associated with each other. The management address is, for example, a transmission source address included in a signal related to the return.

In step S65, the general-purpose device controller 11 determines whether requests of return of management data for all the management addresses have ended. If the requests of return of management data for all the management addresses have ended, the general-purpose device controller 11 proceeds to step S66. On the other hand, if the requests of return of management data for all the management addresses have not ended, the general-purpose device controller 11 returns to step S61.

In step S66, the general-purpose device controller 11 executes a second predetermined cycle corresponding process. After the second predetermined cycle corresponding process ends, the general-purpose device controller 11 ends the process.

Figure 12:
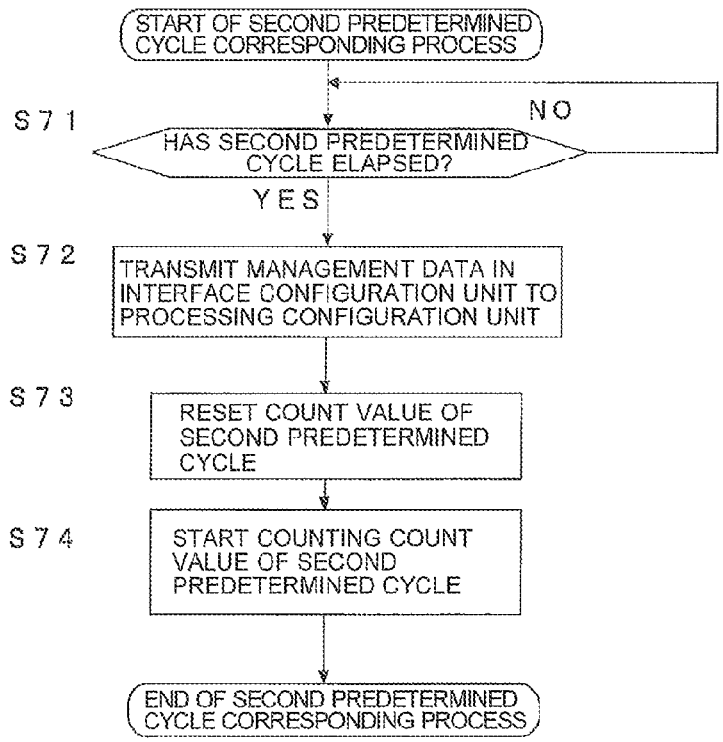
FIG. 12 is a flowchart explaining a detailed example of a second predetermined cycle corresponding process of the general-purpose device controller 11 according to Embodiment 1 of the present invention.

FIG. 12 is a flowchart explaining a detailed example of the second predetermined cycle corresponding process of the general-purpose device controller 11 according to Embodiment 1 of the present invention. The process described with reference to FIG. 12 is shown as an example in which transmission of management data from the interface configuration unit 301 to the processing configuration unit 303 is executed every second predetermined cycle.

In step S71, the general-purpose device controller 11 determines whether the second predetermined cycle has elapsed. If the second predetermined cycle has elapsed, the general-purpose device controller 11 proceeds to step S72. If the second predetermined cycle has not elapsed, the general-purpose device controller 11 returns to step S71.

In step S72, the general-purpose device controller 11 transmits the management data in the interface configuration unit 301 to the processing configuration unit 303.

In step S73, the general-purpose device controller 11 resets a count value of the second predetermined cycle.

In step S74, the general-purpose device controller 11 starts counting a count value of the second predetermined cycle and ends the process.

Thus, in the general-purpose device controller 11, transmission of the management data from the interface configuration unit 301 to the processing configuration unit 303 is executed every second predetermined cycle.

Figure 13:
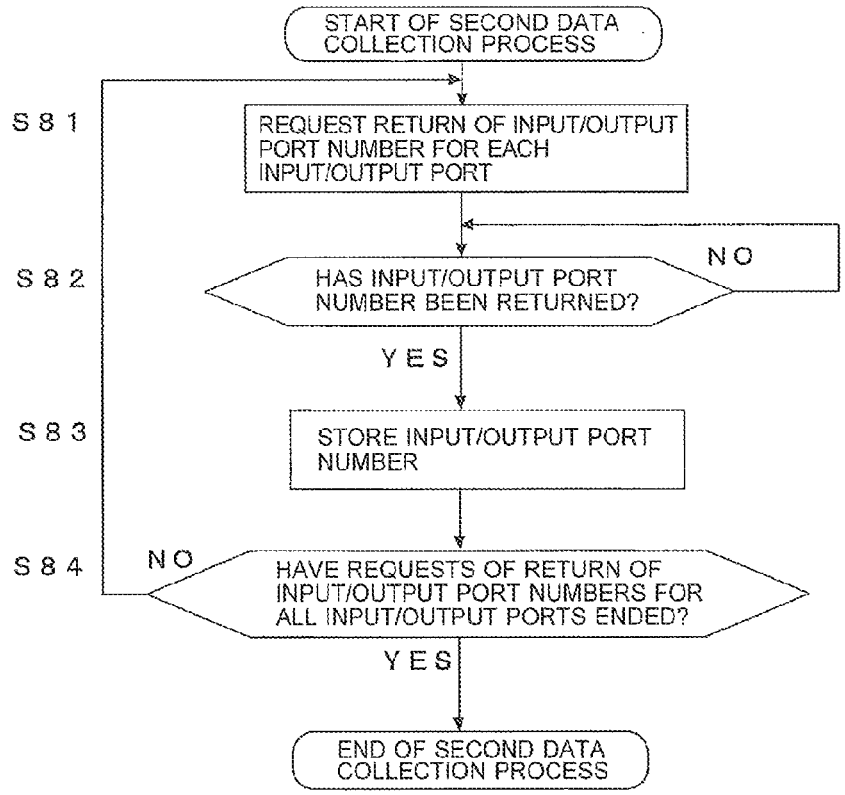
FIG. 13 is a flowchart explaining a detailed example of a second data collection process of the general-purpose device controller 11 according to Embodiment 1 of the present invention.

FIG. 13 is a flowchart explaining a detailed example of the second data collection process of the general-purpose device controller 11 according to Embodiment 1 of the present invention.

In step S81, the general-purpose device controller 11 requests return of an input/output port number for each input/output port.

In step S82, the general-purpose device controller 11 determines whether an input/output port number has been returned. If an input/output port number has been returned, the general-purpose device controller 11 proceeds to step S83. On the other hand, if an input/output port number has not been returned, the general-purpose device controller 11 returns to step S82.

If an input/output port number has not been returned in step S82, the general-purpose device controller 11 may not return to step S82, may execute a process described below, and then may proceed to step S83. For example, if an input/output port number has not been returned, a logical connection relation of the general-purpose device 21 corresponding to the input/output port number, with the input/output signal line 31 is defined as being cancelled. After defining so, the general-purpose device controller 11 excludes the general-purpose device 21 corresponding to the input/output port number from control targets if an input/output port number has not been returned. That is, a process is executed in which a control logic using the input/output port number is considered as not having been initially implemented.

In step S83, the general-purpose device controller 11 stores the input/output port number.

In step S84, the general-purpose device controller 11 determines whether requests of return of input/output port numbers for all the input/output ports have ended. If the requests of return of input/output port numbers for all the input/output ports have ended, the general-purpose device controller 11 ends the process. On the other hand, if the requests of return of input/output port numbers for all the input/output ports have not ended, the general-purpose device controller 11 returns to step S81.

A step of describing a program which performs the operations of Embodiment 1 includes processes performed time-sequentially in accordance with a described order as well as processes which are not necessarily performed time-sequentially and are performed in parallel or individually.

FIG. 14 is a diagram showing an example of various PLC programs according to Embodiment 1 of the present invention. As shown in FIG. 14, it is assumed that a first PLC program 701 has been described. In the first PLC program 701, D13 is defined as a general-purpose device parameter. D13 is, for example, one of registers which store data within the general-purpose device controller 11. As the general-purpose device 21, the temperature/humidity sensor 107 is connected to the analog port 431. In this state, temperature data which is one of detection results of the temperature/humidity sensor 107 is stored in D13. Thus, a process is described in which any one of a first ganged control 801, a second ganged control 802, and a third ganged control 803 is selected by comparing D13 with each threshold. In addition, K200 is a constant which is a decimal number and means 20, K300 is a constant which is a decimal number and means 30, and K400 is a constant which is a decimal number and means 40.

For example, if D13 is lower than K200, that is, if the temperature data stored in D13 is lower than 20, the first ganged control 801 is executed. For example, if the temperature data is 15, since the temperature data is lower than 20, the first ganged control 801 is executed. This means that, for example, since the detection result is 15 degrees C. and the threshold is 20 degrees C., the first ganged control 801 is selected. That is, a logic of ganged control is executed by using the threshold stored in D13.

In addition, for example, if D13 is the same as K300, that is, if the temperature data stored in D13 is lower than 30, the second ganged control 802 is executed. For example, if the temperature data is 30, since the temperature data is the same as 30, the second ganged control 802 is executed. This means that, for example, since the detection result is 30 degrees C. and the threshold is 30 degrees C., the second ganged control 802 is selected. That is, a logic of ganged control is executed by using the threshold stored in D13.

In addition, for example, if D13 is lower than K400, that is, if the temperature data stored in D13 is lower than 40, the third ganged control 803 is executed. For example, if the temperature data is 35, since the temperature data is lower than 40, the third ganged control 803 is executed. This means that, for example, since the detection result is 35 degrees C. and the threshold is 40 degrees C., the third ganged control 803 is selected. That is, a logic of ganged control is executed by using the threshold stored in D13.

Moreover, as shown in FIG. 14, it is assumed that a second PLC program 702 has been described. In the second PLC program 702, M03 is defined as an air-conditioning facility parameter, and M13 and M15 are defined as general-purpose device parameters. Each of M03, M13, and M15 is, for example, one of auxiliary relays within the general-purpose device controller 11. M03 is a virtual device connected in series with a B contact, and it is defined to mean that the outdoor unit 51 has stopped if M03 is true. M13 is a virtual device connected in series with the B contact, and it is defined to mean that the humidifier 101, which is one component of the general-purpose device 21, is to be stopped if M13 is true. M15 is a virtual device connected in series with the B contact, and it is defined to mean that the heater 103, which is one component of the general-purpose device 21, is to be stopped if M15 is true. The B contact is a normally-on contact.

For example, when the outdoor unit 51 has stopped, if the humidifier 101 is stopped, a fourth ganged control 804 is selected. In addition, when the outdoor unit 51 has stopped, if the heater 103 is stopped, a fifth ganged control 805 is executed. That is, a logic of ganged control is executed by using AND condition of M03 and M13, AND condition of M03 and M15, and OR condition of M13 and M15.

Figure 15:
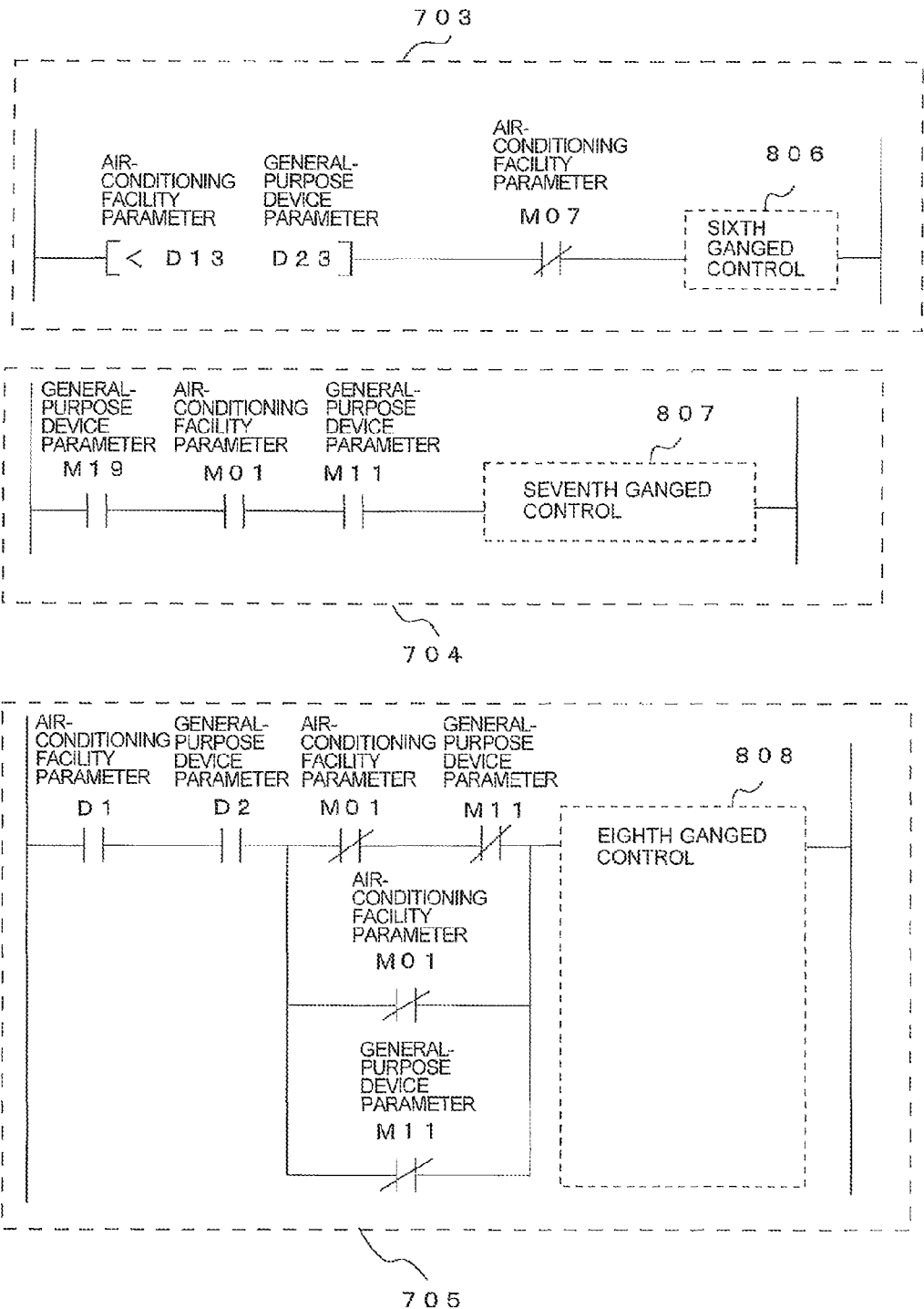
FIG. 15 is a diagram showing an example of various PLC programs according to Embodiment 1 of the present invention.

FIG. 15 is a diagram showing an example of various PLC programs according to Embodiment 1 of the present invention. As shown in FIG. 15, it is assumed that a third PLC program 703 has been described. In the third PLC program 703, D13 and M07 are defined as air-conditioning facility parameters, and D23 is defined as a general-purpose device parameter. Each of D13 and D23 is, for example, one of registers which store data within the general-purpose device controller 11. M07 is, for example, one of auxiliary relays within the general-purpose device controller 11, and is a virtual device connected in series with the B contact. For example, it is assumed that a set temperature of the indoor unit 53 is stored in D13, and a detection result of the temperature/humidity sensor 107 connected to the analog port 431 is stored in D23. In addition, it is defined to mean that the indoor unit 53 has stopped if M07 is true.

For example, if D13 is lower than D23 and M07 is true, that is, if the set temperature stored in D13 is lower than the detection result of the temperature/humidity sensor 107 stored in D23 and the indoor unit 53 has stopped, a sixth ganged control 806 is executed. The sixth ganged control 806 is, for example, control of operating the outdoor unit 51 and the heater 103 connected to the digital port 433. That is, a logic of ganged control is executed by using the thresholds stored in D13 and D23.

In addition, as shown in FIG. 15, it is assumed that a fourth PLC program 704 has been described. In the fourth PLC program, M11 and M19 are defined as general-purpose device parameters, and M01 is defined as an air-conditioning facility parameter. Each of M01, M11, and M19 is, for example, one of auxiliary relays within the general-purpose device controller 11, and is a virtual device connected in series with an A contact. It is defined that the wireless port 437 is being activated if M19 is true. It is defined that the entire air-conditioning facility 23 is in an operating state if M01 is true. It is defined that the entire general-purpose device 21 is in an operating state if M11 is true. The A contact is a normally-off contact.

For example, if a control signal is transmitted through the wireless port 437 from a smartphone or the like and the air-conditioning facility 23 and the general-purpose device 21 are in an operating state, a seventh ganged control 807 is executed in accordance with the control signal. That is, a logic of ganged control is executed by using AND condition of M19, M01, and M11.

In addition, as shown in FIG. 15, it is assumed that a fifth PLC program 705 has been described. In the fifth PLC program 705, D1 and M01 are defined as air-conditioning facility parameters, and D2 and M11 are defined as general-purpose device parameters. Each of D1 and D2 is, for example, one of registers which store data within the general-purpose device controller 11. For example, it is assumed that data indicating that no management data has been returned from the air-conditioning facility 23 is stored in D1, and data indicating that no input/output port number has been returned from the general-purpose device 21 is stored in D2. Meanwhile, each of M01 and M11 is, for example, one of auxiliary relays within the general-purpose device controller 11, and is a virtual device connected in series with the B contact. For example, it is defined to mean that the entire air-conditioning facility 23 is to be stopped if M01 is true. In addition, it is defined to mean that the entire general-purpose device 21 is to be stopped if M11 is true.

For example, if no management data has been returned from the air-conditioning facility 23 and no input/output port number has been returned from the general-purpose device 21, stopping the air-conditioning facility 23 and the general-purpose device 21, stopping the air-conditioning facility 23, or stopping the general-purpose device 21 is selected, and an eighth ganged control 808 is executed. That is, a logic of ganged control is executed by using the thresholds stored in D1 and D2, AND condition of D1, D2, M01, and M11, AND condition of D1, D2, and M01, AND condition of D1, D2, and M11, and OR condition of M01 and M11, M01, and M11.

The various PLC programs described above, the parameters thereof, the thresholds thereof, and the like are shown as examples, and are not particularly limited thereto. The description format and the meaning of the description of the various PLC programs are shown as examples, and are not particularly limited thereto. The various PLC programs have been described, but are not particularly limited thereto. For example, a control program in which a logical configuration of control is defined may be used. That is, PLC has been described as representing a so-called programmable logic controller, but is merely an example, and is not limited to mean a component which is a programmable logic controller. However, the processing configuration unit 303 itself may be composed of a PLC.

From the above description, in Embodiment 1, the air-conditioning system 1 is configured which includes the general-purpose device controller 11 configured to control the general-purpose device 21 connected via the general-purpose transmission line 30 or the input/output signal line 31 and the air-conditioning facility 23 connected via the dedicated transmission line 33, and in which: the general-purpose device controller 11 includes the processing configuration unit 303 configured to receive a first signal corresponding to the air-conditioning facility 23 and a second signal corresponding to the general-purpose device 21 and transmit a control signal which controls the air-conditioning facility 23 and the general-purpose device 21, based on the first signal and the second signal; and the processing configuration unit 303 designates the air-conditioning facility 23 which is a first control target, with a management address which is included in the first signal and designates the air-conditioning facility 23, designates the general-purpose device 21 which is a second control target, with an input/output port number which is included in the second signal and designates the general-purpose device 21, and transmits a control signal which performs ganged control of the first control target and the second control target.

In the above configuration, since complex control commands which designate an air-conditioning device provided in the air-conditioning facility 23 and the general-purpose device 21, respectively, are sent through respective communication media to the air-conditioning facility 23 and the general-purpose device 21, it is possible to perform ganged control of the air-conditioning facility 23 and the general-purpose device 21. Thus, it is possible to provide the air-conditioning system 1 which includes the air-conditioning facility 23 and the general-purpose device 21 and performs integrated control. Therefore, it is possible to improve the energy saving performance of the entire system and the comfort.

In addition, in Embodiment 1, the general-purpose device controller 11 further includes the interface configuration unit 301 configured to relay various signals transmitted and received between the air-conditioning facility 23 and the processing configuration unit 303, and the interface configuration unit 301 collects a first signal determined to be collected based on a management address, of first signals flowing on the dedicated transmission line 33.

In addition, in Embodiment 1, a first predetermined cycle is set as a timing at which a first signal is collected, and if a first signal has been requested to the air-conditioning facility 23 and has been returned, the interface configuration unit 301 collects a first signal determined to be collected based on a management address, every first predetermined cycle.

In addition, in Embodiment 1, a second predetermined cycle longer than the first predetermined cycle is set as a timing at which the collected first signal is supplied to the processing configuration unit 303, and the interface configuration unit 301 supplies the collected first signal to the processing configuration unit 303 every second predetermined cycle.

In addition, in Embodiment 1, the general-purpose device controller 11 further includes the input/output port 305 configured to relay various signals transmitted and received between the general-purpose device 21 and the processing configuration unit 303, a first predetermined cycle is set as a timing at which a second signal is collected, and if a second signal has been requested to the input/output port 305 and has been returned, the processing configuration unit 303 collects an input/output port number included in the second signal, every first predetermined cycle.

In addition, in Embodiment 1, the input/output port 305 supplies a detection result of the general-purpose device 21 to the processing configuration unit 303, and the processing configuration unit 303 transmits a control signal generated based on the detection result, to the general-purpose device 21 through the input/output port 305.

In addition, in Embodiment 1, the processing configuration unit 303 executes control of a combination of the air-conditioning facility 23 and the general-purpose device 21 based on a management address and an input/output port number.

In addition, in Embodiment 1, the processing configuration unit 303 excludes, from control targets, the air-conditioning facility 23 corresponding to a management address which is not supplied from the interface configuration unit 301, of management addresses included in a control signal, and excludes, from the control targets, the general-purpose device 21 corresponding to an input/output port number which is not supplied from the input/output port number, of input/output port numbers included in a control signal.

In addition, in Embodiment 1, the processing configuration unit 303 includes the control block module 407 configured to execute preset various processes based on the first signal and the second signal, and the control block module 407 is formed as an updatable program module.

In addition, in Embodiment 1, for the various processes, a control logic is created based on a PLC program, the control block module 407 sets a physical execution environment for the control logic and executes the control logic, and the PLC program is edited by either the air-conditioning remote controller 71 which is one component of the air-conditioning facility 23 or the client terminal 109 which is one component of the general-purpose device 21.

In addition, in Embodiment 1, a PLC program in which the air-conditioning facility 23 corresponding to a management address is set and the general-purpose device 21 corresponding to an input/output port number is set is edited by either the air-conditioning remote controller 71 or the client terminal 109.

In the above configuration, it is possible to particularly significantly improve the energy saving performance of the entire system and the comfort.

Embodiment 2

In Embodiment 2, an air-conditioning system 2 includes a centralized controller 901, and the centralized controller 901 manages a plurality of air-conditioning facilities 23-1 and 23-2. Thus, the difference from Embodiment 1 is that the centralized controller 901 is newly added to the system configuration. In Embodiment 2, items which are not particularly described are the same as those in Embodiment 1, and the same functions and components are described using the same reference sings.

Figure 16:
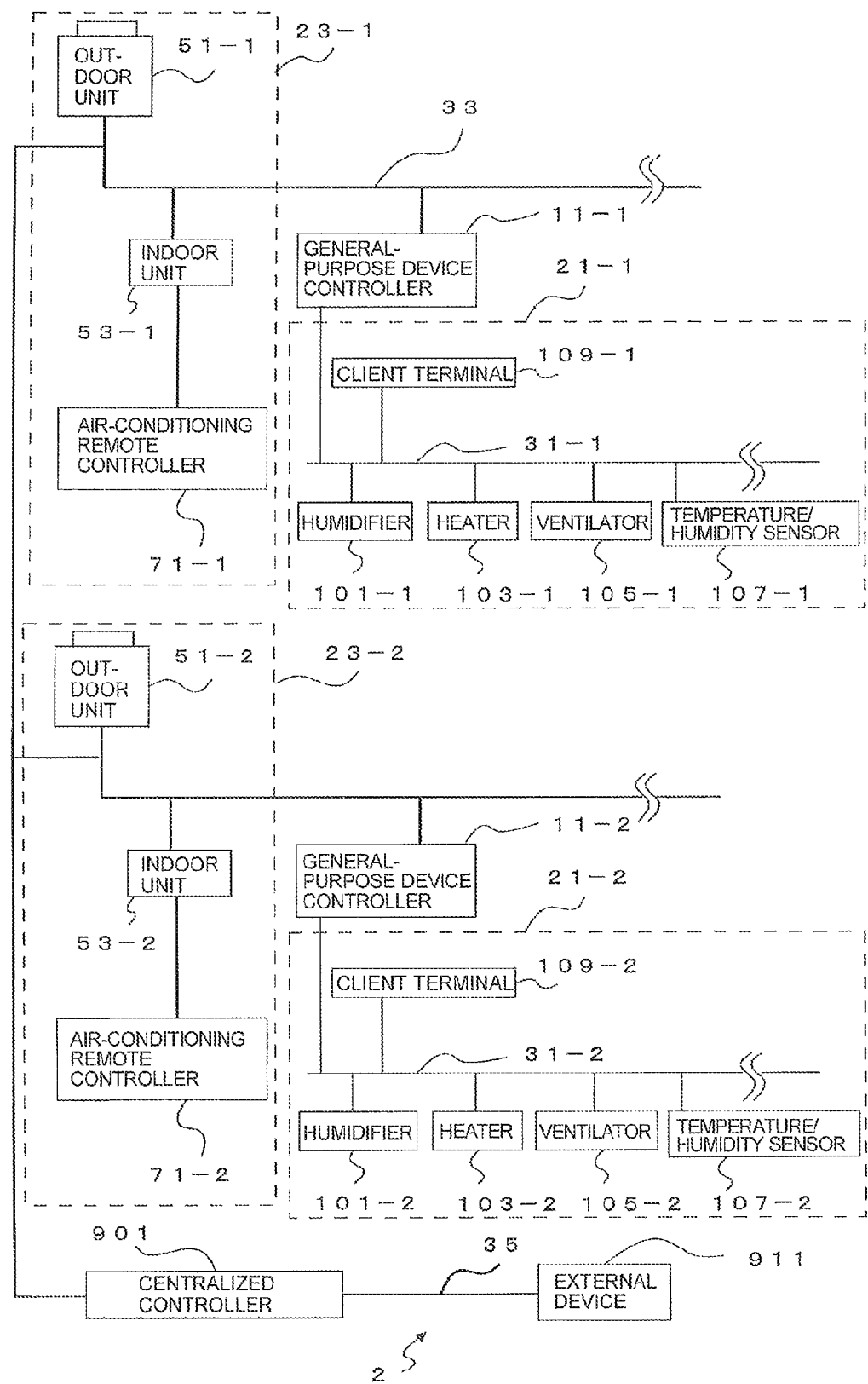
FIG. 16 is a diagram showing a schematic configuration of an air-conditioning system 2 according to Embodiment 2 of the present invention in which a centralized controller 901 monitors an air-conditioning facility 23-1 and an air-conditioning facility 23-2.

FIG. 16 is a diagram showing a schematic configuration of the air-conditioning system 2 according to Embodiment 2 of the present invention, in which the centralized controller 901 monitors the air-conditioning facility 23-1 and the air-conditioning facility 23-2. As shown in FIG. 16, the centralized controller 901 is connected to the dedicated transmission line 33, so that the centralized controller 901 is in a state of being able to mutually communicate with the air-conditioning facility 23-1, a general-purpose device controller 11-1, a general-purpose device 21-1, the air-conditioning facility 23-2, a general-purpose device controller 11-2, and a general-purpose device 21-2. Because of the connection configuration, the centralized controller 901 is able to monitor the air-conditioning facility 23-1 and the air-conditioning facility 23-2 and perform various operations. In addition, the centralized controller 901 is able to mutually communicate with the general-purpose device controller 11-1 and the general-purpose device controller 11-2, and thus is able to perform various cooperative processes. Moreover, the centralized controller 901 is able to perform various cooperative processes with the general-purpose device controller 11-1 and the general-purpose device controller 11-2, and thus is able to monitor the general-purpose device 21-1 and the general-purpose device 21-2, perform various operations, and perform various settings. Furthermore, the centralized controller 901 is connected to an external device 911 via a LAN 35.

The general-purpose device controller 11-1 and the general-purpose device controller 11-2 are collectively referred to as a general-purpose device controller 11. In addition, the air-conditioning facility 23-1 and the air-conditioning facility 23-2 are collectively referred to as an air-conditioning facility 23. Moreover, the general-purpose device 21-1 and the general-purpose device 21-2 are collectively referred to as a general-purpose device 21.

Figure 17:
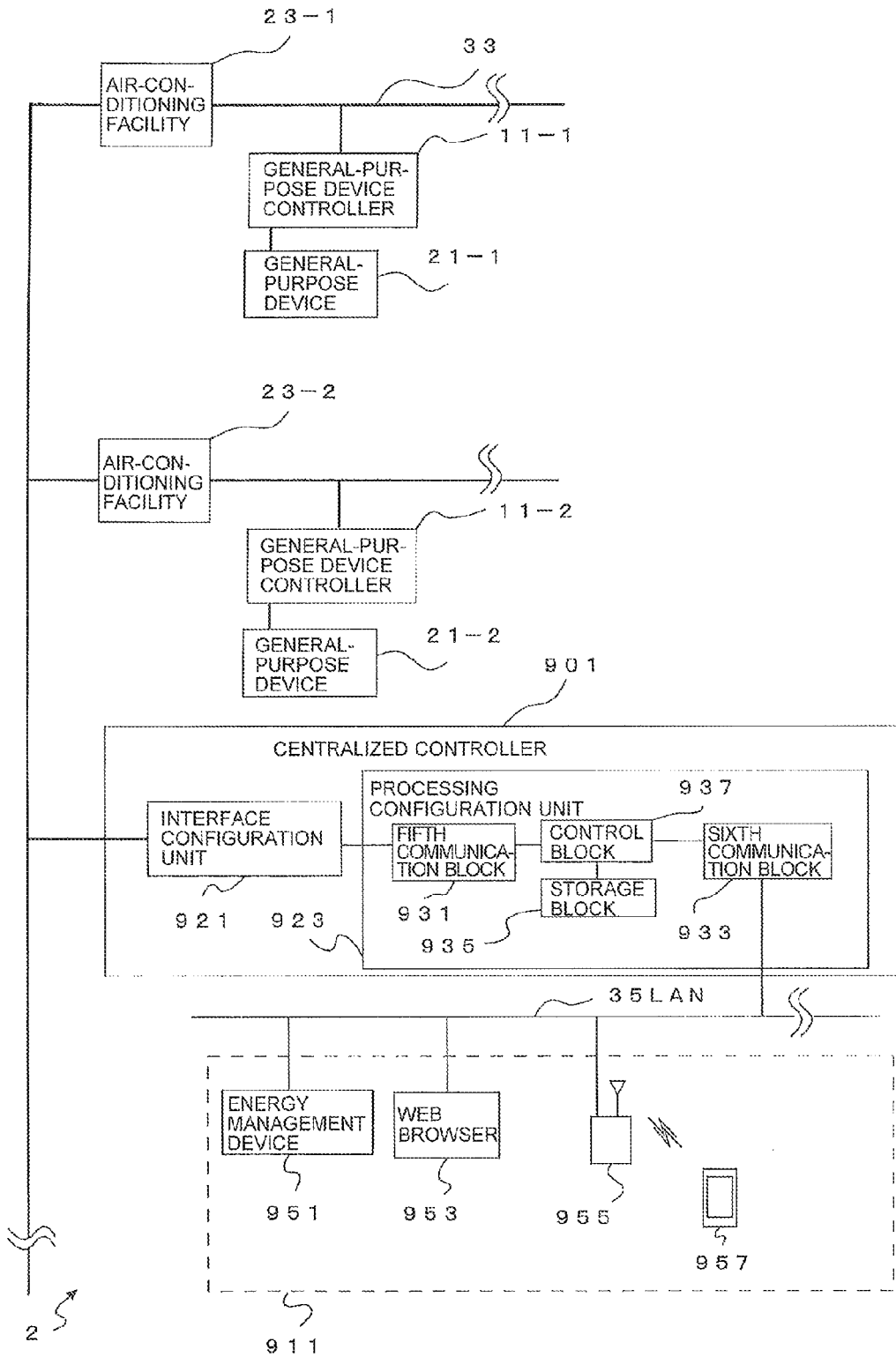
FIG. 17 is a diagram showing an example of a functional configuration of the centralized controller 901 according to Embodiment 2 of the present invention.

FIG. 17 is a diagram showing an example of a functional configuration of the centralized controller 901 according to Embodiment 2 of the present invention. As shown in FIG. 17, the centralized controller 901 includes an interface configuration unit 921 and a processing configuration unit 923. The interface configuration unit 921 relays various signals transmitted and received between the air-conditioning facility 23 and the general-purpose device controller 11, and the processing configuration unit 923, and converts a communication frame according to a communication protocol as appropriate.

The processing configuration unit 923 includes a fifth communication block 931, a sixth communication block 933, a storage block 935, and a control block 937, and performs monitoring, operations, settings, and the like of the general-purpose device controller 11, the air-conditioning facility 23, and the general-purpose device 21. The fifth communication block 931 relays communication between the interface configuration unit 921 and the control block 937. The sixth communication block 933 relays communication between the control block 937 and the external device 911. The storage block 935 stores various data regarding monitoring, operations, settings, and the like of the general-purpose device controller 11, the air-conditioning facility 23, and the general-purpose device 21. The control block 937 integrally manages the processing configuration unit 923.

As the external device 911, for example, an energy management device 951, a WEB browser 953, a wireless transmitter 955, and a tablet terminal 957 are assumed. The energy management device 951 manages, for example, power consumption and the like of the air-conditioning facility 23, the general-purpose device 21, and the like. The WEB browser 953 allows, for example, an operating state of the air-conditioning facility 23, an operating state of the general-purpose device 21, an operating condition of the general-purpose device controller 11, management contents of the centralized controller 901, and the like to be viewed. The wireless transmitter 955 is a device which allows various signals to be transmitted and received from various wireless terminals. The tablet terminal 957 is a movable hand-held terminal and allows the centralized controller 901 and the like to be monitored from a remote location.

Each function of the centralized controller 901 may be implemented by hardware or may be implemented by software. That is, each block diagram described in Embodiment 2 may be considered as a block diagram of hardware or may be considered as a functional block diagram of software. For example, each block diagram may be implemented by hardware such as a circuit device or the like, or may be implemented by software executed on an arithmetic unit such as a processor.

The example has been described above in which the general-purpose device controller 11 and the centralized controller 901 separately perform calculations, and processes thereof are implemented in separate housings, that is, at locations physically apart from each other, but the general-purpose device controller 11 and the centralized controller 901 are not particularly limited thereto. For example, the function of the general-purpose device controller 11 and the function of the centralized controller 901 may be implemented in logically different forms in a single server device. That is, the function of the general-purpose device controller 11 and the function of the centralized controller 901 suffice to be executed, and thus the physical storage locations and execution locations thereof are not particularly limited. For example, the respective operations in FIGS. 8 to 13 may be distributed and processed by a plurality of server devices and the like at remote locations, and processes may be executed while calculation results of the server devices and the like are synchronized with each other. In addition, two functions may be implemented in a single server device by the function of the general-purpose device controller 11 and the function of the centralized controller 901 being virtualized in logically different forms, as described above.

From the above description, in Embodiment 2, the air-conditioning system 2 is configured which further includes the centralized controller 901 which is connected to the dedicated transmission line 33, manages the air-conditioning facility 23 and the general-purpose device controller 11, and manages the general-purpose device 21 via the general-purpose device controller 11.

In the above configuration, the centralized controller 901 is able to manage a plurality of the air-conditioning facilities 23-1 and 23-2.

In Embodiment 2, the centralized controller 901 manages the air-conditioning facility 23, the general-purpose device 21, and the general-purpose device controller 11 based on the first signals and the second signals.

In the above configuration, it is possible to particularly significantly improve the energy saving performance of the entire system and the comfort.

Embodiments 1 and 2 may be individually practiced or may be practiced in combination. In either case, the advantageous effects described above are achieved.

REFERENCE SIGNS LIST

1, 2 air-conditioning system 11, 11-1, 11-2 general-purpose device controller 12 memory card 13, 963 RAM 21, 21-1, 21-2 general-purpose device 23, 23-1, 23-2 air-conditioning facility 30 general-purpose transmission line 31, 31-1, 31-2 input/output signal line 33 dedicated transmission line 35 LAN 41 refrigerant pipe 51, 51-1, 51-2 outdoor unit 53, 53-1, 53-2 indoor unit 61 outdoor unit temperature sensor 63 indoor unit humidity sensor 65 indoor unit temperature sensor 71, 71-1, 71-2 air-conditioning remote controller 73 display section 75 operation section 81 illuminance sensor 83 human detection sensor 101, 101-1, 101-2 humidifier 103, 103-1, 103-2 heater 105, 105-1, 105-2 ventilator 85, 107, 107-1, 107-2 temperature/humidity sensor 109, 109-1, 109-client terminal 111 compressor 113 four-way switching valve 115 outdoor unit side heat exchanger 117 outdoor unit side expansion valve 119 accumulator 121 outdoor unit side fan 131 outdoor unit control means 133 outdoor unit communication means 215 indoor unit side heat exchanger 217 indoor unit side expansion valve 221 indoor unit side fan 231 indoor unit control means 233 indoor unit communication means 301, 921 interface configuration unit 303, 923 processing configuration unit 305 input/output port 355, 455, 935, 968 storage block 401 first communication block 403 second communication block 405 storage block module 407 control block module 417, 937 control block 411 collection data storage area 413 PLC program storage area 420 third communication block 421 fourth communication block 431 analog port 433 digital port 435 USB port 437 wireless port 439 LAN port 501 input device 503 output device 601 edit screen 603 edit window 605 input window 611 device selection area 613 device name input area 615 OK button 617 cancel button 631 editing area 701 first PLC program 702 second PLC program 703 third PLC program 704 fourth PLC program 705 fifth PLC program 801 first ganged control 802 second ganged control 803 third ganged control 804 fourth ganged control 805 fifth ganged control 806 sixth ganged control 807 seventh ganged control 808 eighth ganged control 901 centralized controller 911 external device 931 fifth communication block 933 sixth communication block 951 energy management device 953 WEB browser 955 wireless transmitter 957 tablet terminal 961 CPU 962 ROM 964 bus 965 input/output interface 966 input block 967 output block 969 communication block 970 drive

The invention claimed is:

1. An air-conditioning system comprising a general-purpose device controller configured to control a general-purpose device connected via one of a general-purpose transmission line and an input/output signal line and an air-conditioning facility connected via a dedicated transmission line, wherein the general-purpose device controller includes a processing configuration unit configured to receive a first signal corresponding to the air-conditioning facility and a second signal corresponding to the general-purpose device, and transmit a control signal which controls the air-conditioning facility and the general-purpose device based on the first signal and the second signal, the processing configuration unit:
is configured to designate the air-conditioning facility which is a first control target, with a management address which is included in the first signal and designates the air-conditioning facility,
is configured to designate the general-purpose device which is a second control target, with an input/output port number which is included in the second signal and designates the general-purpose device, and
is configured to transmit the control signal which performs ganged control of the first control target and the second control target, the general-purpose device controller further includes an interface configuration unit configured to relay various signals transmitted and received between the air-conditioning facility and the processing configuration unit, in the interface configuration unit, a first predetermined cycle is set as a timing of collecting the first signal and a second predetermined cycle longer than the first predetermined cycle is set as a timing of supplying the collected first signal to the processing configuration unit, and when the first signal is requested to the air-conditioning facility and is returned, the interface configuration unit collects the first signal determined to be collected based on the management address of the first signals flowing on the dedicated transmission line every first predetermined cycle, and the interface configuration unit supplies the collected first signal to the processing configuration unit every second predetermined cycle.

2. The air-conditioning system of claim 1, wherein the general-purpose device controller further includes an input/output port configured to relay various signals transmitted and received between the general-purpose device and the processing configuration unit, in the processing configuration unit, the first predetermined cycle is set as a timing of collecting the second signal, and when the second signal is requested to the input/output port and is returned, the processing configuration unit collects the input/output port number included in the second signal every first predetermined cycle.

3. The air-conditioning system of claim 2, wherein
the input/output port supplies a detection result of the general-purpose device to the processing configuration unit, and
the processing configuration unit transmits the control signal generated based on the detection result, to the general-purpose device via the input/output port.

4. The air-conditioning system of claim 3, wherein
the processing configuration unit executes control of a combination of the air-conditioning facility and the general-purpose device based on the management address and the input/output port number.

5. The air-conditioning system of claim 4, wherein
the processing configuration unit excludes the air-conditioning facility corresponding to a management address that is not supplied from the interface configuration unit, of the management addresses included in the control signal, from control targets, and
the processing configuration unit excludes the general-purpose device corresponding to an input/output port number that is not supplied from the input/output port, of the input/output port numbers included in the control signal, from the control targets.

6. The air-conditioning system of claim 1, wherein
the processing configuration unit includes a control block module configured to execute a program for ganged control of the air-conditioning facility and the general-purpose device,
the control block module executes preset various processes based on the first signal and the second signal, and
the control block module is formed as an updatable program module.

7. The air-conditioning system of claim 6, wherein
the program includes a PLC program,
for the various processes, a control logic is created based on the PLC program,
the control block module sets a physical execution environment for the control logic and executes the control logic, and
the PLC program is edited by either one of an air-conditioning remote controller which is one component of the air-conditioning facility and a client terminal which is one component of the general-purpose device.

8. The air-conditioning system of claim 7, wherein
by either one of the air-conditioning remote controller and the client terminal, the PLC program in which the air-conditioning facility corresponding to the management address is set and the general-purpose device corresponding to the input/output port number is set is edited.

9. The air-conditioning system of claim 1, further comprising
a centralized controller connected to the dedicated transmission line and configured to manage the air-conditioning facility and the general-purpose device controller, and manage the general-purpose device via the general-purpose device controller.

10. The air-conditioning system of claim 9, wherein
the centralized controller manages the air-conditioning facility, the general-purpose device, and the general-purpose device controller based on the first signal and the second signal.

* * * * *